US008247522B2

(12) United States Patent
DeBruin et al.

(10) Patent No.: US 8,247,522 B2
(45) Date of Patent: Aug. 21, 2012

(54) PRODUCTION OF NON-SOLID-STATED POLYESTER PARTICLES HAVING SOLID-STATED PROPERTIES

(75) Inventors: Bruce Roger DeBruin, Gray, TN (US); Tommy Ray Maddox, II, Lexington, SC (US); John Alan Wabshall, Jr., Lexington, SC (US); Steven Lee Stafford, Gray, TN (US); Stephen Weinhold, Kingsport, TN (US); Robert Noah Estep, Kingsport, TN (US); Mary Therese Jernigan, Kingsport, TN (US); Steven Paul Bellner, Kingsport, TN (US); Alan George Wonders, Longview, TX (US); John Guy Franjione, Johnson City, TN (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 0 days.

(21) Appl. No.: 13/163,488

(22) Filed: Jun. 17, 2011

(65) Prior Publication Data
US 2011/0251340 A1    Oct. 13, 2011

Related U.S. Application Data

(63) Continuation of application No. 12/955,964, filed on Nov. 30, 2010, now Pat. No. 7,989,577, which is a continuation of application No. 12/394,478, filed on Feb. 27, 2009, now Pat. No. 7,868,125.

(60) Provisional application No. 61/033,257, filed on Mar. 3, 2008, provisional application No. 61/033,254, filed on Mar. 3, 2008, provisional application No. 61/033,250, filed on Mar. 3, 2008, provisional application No. 61/033,239, filed on Mar. 3, 2008, provisional application No. 61/033,234, filed on Mar. 3, 2008.

(51) Int. Cl.
*C08G 63/00* (2006.01)
*C08G 63/02* (2006.01)

(52) U.S. Cl. ............... 528/308.1; 422/245.1; 422/255; 528/271; 528/272; 528/274

(58) Field of Classification Search ............... 422/245.1, 422/255; 528/271, 272, 274, 308.1
See application file for complete search history.

(56) References Cited

U.S. PATENT DOCUMENTS

| 4,446,303 | A | 5/1984 | Moore et al. |
|---|---|---|---|
| 5,145,742 | A | 9/1992 | Yau |
| 5,597,891 | A | 1/1997 | Nelson et al. |
| 5,648,032 | A | 7/1997 | Nelson et al. |
| 5,750,644 | A | 5/1998 | Duh |
| 6,048,957 | A | 4/2000 | Ekart et al. |
| 6,060,140 | A | 5/2000 | Sprayberry et al. |
| 6,099,778 | A | 8/2000 | Nelson et al. |
| 6,110,406 | A | 8/2000 | Ishibashi et al. |
| 6,159,406 | A | 12/2000 | Shelby et al. |
| 6,339,109 | B1 | 1/2002 | Day et al. |
| 6,344,539 | B1 | 2/2002 | Palmer |
| 6,740,377 | B2 | 5/2004 | Pecorini et al. |
| 7,084,235 | B2 | 8/2006 | Otto et al. |
| H2169 | H | 9/2006 | Richeson |
| 7,179,881 | B2 | 2/2007 | Bonner et al. |
| 7,192,545 | B2 | 3/2007 | Ekart et al. |
| 7,204,945 | B2 | 4/2007 | Bonner |
| 7,217,782 | B2 | 5/2007 | Bonner |
| 7,250,486 | B1 | 7/2007 | McGehee |
| 7,329,723 | B2 | 2/2008 | Jernigan et al. |
| 7,662,880 | B2 | 2/2010 | Xia et al. |
| 7,674,877 | B2 | 3/2010 | Jernigan et al. |
| 7,868,125 | B2 | 1/2011 | DeBruin et al. |
| 2004/0228993 | A1 | 11/2004 | Weinhold et al. |
| 2005/0065318 | A1 | 3/2005 | Jernigan et al. |
| 2005/0085620 | A1 | 4/2005 | Bruckmann |
| 2006/0046004 | A1 | 3/2006 | Ekart et al. |
| 2007/0265429 | A1 | 11/2007 | Hudson |
| 2007/0270533 | A1 | 11/2007 | Ekart et al. |
| 2008/0090046 | A1 | 4/2008 | Ensinger et al. |

FOREIGN PATENT DOCUMENTS

| DE | 10 2004 062 799 A1 | 6/2006 |
|---|---|---|
| WO | 9622320 | 7/1996 |
| WO | 0071320 | 11/2000 |
| WO | 2006028749 | 3/2006 |
| WO | 2006057635 | 6/2006 |
| WO | 2008075916 | 6/2008 |

OTHER PUBLICATIONS

European Office Action issued Jul. 27, 2011, in Patent Application No. 09 717 675.4.
Culbert et al, "Continuous Solid-State Polycondensation of Polyesters," Chapter 4 from Modern Polyesters: Chemistry and Technology of Polyesters and Copolyesters, pp. 143-194, 2003, John Wiley & Sons, Ltd.
McGehee et al., "Maximizing PET SSP Line Profitability Through World Scale Process Design and Operations," POLYESTER 2004, 9th, World Congress, Dec. 7-8-9, 2004, Zurich, Switzerland, downloaded from internet, "http://www.uop.com/objects/Maack%202004.pdf" on Aug. 2, 2010.
Brochure, "DHI—Direct High Intrinsic Viscosity," Lurgi Zimmer GmbH, downloaded from internet, "http://www.lurgi.com/website/fileadmin/pdfs/brochures/DHI-NEU_en.pdf" on Aug. 2, 2010.
International Search Report for PCT/US2009/001343 dated Apr. 22, 2009.

(Continued)

*Primary Examiner* — Terressa Boykin

(74) *Attorney, Agent, or Firm* — Oblon, Spivak, McClelland, Maier & Neustadt, L.L.P.

(57) ABSTRACT

A process for producing non-solid-stated polyester polymer particles having one or more properties similar to polyester polymer particles that have undergone solid-state processing.

26 Claims, 3 Drawing Sheets

OTHER PUBLICATIONS

Copending U.S. Appl. No. 12/394,478, filed Feb. 27, 2009.
Copending U.S. Appl. No. 12/909,107, filed Oct. 21, 2010.
Office Action issued Dec. 19, 2011, in European Patent Application No. 09 717 675.4.
Mexican Office Action issued on Aug. 25, 2011, in Patent Application No. MX/A/2010/009422.

US 8,247,522 B2

PRODUCTION OF NON-SOLID-STATED POLYESTER PARTICLES HAVING SOLID-STATED PROPERTIES

CROSS REFERENCES TO RELATED APPLICATIONS

This application is a continuation application claiming priority to U.S. patent application Ser. No. 12/394,478, filed Feb. 27, 2009, which claims the benefit of the following U.S. Provisional Application Ser. Nos. 61/033,234, 61/033,239, 61/033,250, 61/033,254, and 61/033,257, each filed Mar. 3, 2008. Each of the above applications is incorporated herein by reference in its entirety.

FIELD OF THE INVENTION

The present invention relates generally to processes for making polyester polymer particles. In another aspect, the invention concerns processes for producing polyethylene terephthalate (PET) particles from a polyester polymer melt.

Typically, polyester polymers are formed into relatively small particles that are easily transportable and can be processed in bulk to produce a variety of polymer-containing end products. In general, the end products (e.g., water and soda bottles, food containers, consumer product containers, and the like) are formed by melting the polymer particles and then shaping the melted polymer into the desired product configuration. For example, plastic beverage containers are often made by melting polyethylene terephthalate (PET) particles in an extruder, shaping the melted PET into preforms, and then blow and/or stretch blow molding the preforms into the final form.

Traditional (PET) polymer particulation processes generally include a solid-state polymerization (i.e., "solid-stating) step near the end of the process, wherein the particles undergo further polymerization to increase the intrinsic viscosity (It.V.) to a desired level. During solid-stating, the degree of crystallization and the onset-of-melting temperatures of the polymer particles also increase. One drawback associated with solid-state processing is the additional processing equipment required to solid-state the polymer particles and the associated increased capital, operating, and maintenance costs.

Because solid-stating processes have been the predominate method of making polyester polymer particles for years, much of the equipment used to make end products from the polyester polymer particles (e.g., extruders and molding equipment) are specifically designed to handle polyester polymer pellets having the specific characteristics of solid-stated polyester polymer particles.

Thus, it is desirable to develop a process for producing polyester polymer particles that overcomes the high capital and operating costs associated with solid-stating processes. In certain circumstances, it may also be desirable for the improved particle production process to yield non-solid-stated polyester polymer particles that can be processed in conventional melting and molding equipment without modification to the equipment. Therefore, it would be desirable to have a non-solid-stating particulation process that produces polyester polymer particles having melting characteristics to consistently produce a similar quality of molded parts, in conventional melting and molding equipment without modification to the equipment, as those made from conventional solid-stated particles.

SUMMARY

In one embodiment of the present invention, there is provided a polyester polymer production process comprising: (a) forming polyester polymer particles from a polyester polymer melt in a forming zone; (b) subsequent to step (a), quenching at least a portion of the particles via contact with a quench liquid in a quenching zone; (c) subsequent to step (b), drying at least a portion of the particles in a drying zone; (d) subsequent to step (c), crystallizing at least a portion of the particles in a crystallizing zone; and (e) subsequent to step (d), annealing at least a portion of the particles in an annealing zone, wherein at all points during and between steps (b) through (e) the average bulk temperature of the particles is maintained above 165° C.

In another embodiment of the present invention, there is provided a polyester polymer production process comprising: (a) forming initial polyester polymer particles from a polymer melt having an intrinsic viscosity (It.V.) in the range of 0.70 dL/g to 1.2 dL/g when measured at 25° C. in a 60/40 wt/wt phenol/tetrachloroethane solvent at a polymer concentration of 0.50 g/100 ml, wherein the initial particles comprise a shell and a core, wherein the shell is cooler and more crystalline than the core, wherein at least a portion of the shell exhibits strain-induced crystallinity; (b) drying at least a portion of the initial particles to thereby provide dried particles; (c) crystallizing at least a portion of the dried particles to thereby provide crystallized particles exhibiting both strain-induced crystallinity and spherulitic crystallinity; and (d) annealing at least a portion of the crystallized particles to thereby provide annealed particles, wherein the average bulk temperature of the initial particles and the dried particles is maintained above the onset-of-melting temperature ($T_{om}$) of the core, and wherein said polymer melt comprises a carboxylic acid component and a hydroxyl component, wherein said carboxylic acid component comprises at least 80 mole percent of the residues of terephthalic acid and/or derivatives thereof, wherein said hydroxyl component comprises at least 80 mole percent of residues of ethylene glycol.

DETAILED DESCRIPTION

Figure 1:
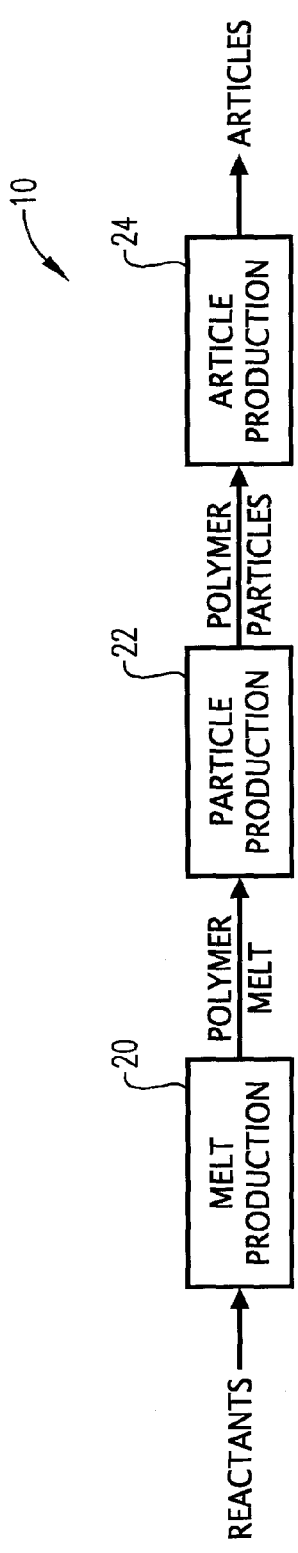
FIG. 1 is a simplified overview of the primary stages involved in a process for producing a polyester article, particularly illustrating the melt production stage, the particle production stage, and the article production stage.

Referring initially to FIG. 1, a simplified overview of the primary stages of a polymer production system 10 is illustrated as generally comprising a melt production zone 20, a particle production zone 22, and an article production zone 24. In general, a polyester polymer melt created in melt production zone 20 can be converted to a plurality of polymer particles in particle production zone 22. The particles can then be utilized to create a variety of polymer articles in article production zone 24. Examples of polymer articles created in article production zone 24 can include, but are not limited to, beverage bottles, food containers, consumer products bottles, films, fibers, and the like.

In contrast to conventional polymer processing schemes, polymer production zone 22 of polymer production system 10 does not employ a solid-state polymerization step in one embodiment of the present invention. However, the polymer particles produced in non-solid-stating particle production zone 22 can be used to produce molded articles with similar quality to those produced from traditional solid-stated polymer particles. For example, in one embodiment, the molded articles produced from non-solid-stated polyester polymer particles exiting production zone 22 can consistently exhibit clarity and structural integrity similar to those produced using conventional solid-stated particles. In order to consistently produce quality molded articles, non-solid-stated polyester polymer particles exiting production zone 22 need to exhibit appropriate melting characteristics.

In general, the melt behavior of the polyester polymer particles can be characterized by thermal analysis with a differential scanning calorimeter (DSC). Two components of melt behavior, melting point, also known as the melting peak temperature, and onset-of-melt temperature, can be determined from a first DSC heating scan as described herein. In general, an 8±1 mg sample of the polymer made up of (1) a portion of a single pellet or (2) a sample taken from several grams of cryogenically ground pellets is heated from about 25° C. and to about 290° C. at a heating rate of 20° C./minute. The temperatures of the resulting endotherm peak(s) measured by the DSC correspond to the melting point(s) of the polymer particles. The onset-of-melt temperature is defined as, the temperature of the intercept of the baseline and the tangent line to the low temperature side of the lowest peak melting endotherm.

For the testing in this application, the instrument(s) used is a TA's Q2000 DSC with a Liquid Nitrogen Cooling System. A detailed procedure follows.

1. Calibrate instrument according to its "User's Manual;" set the onset of melting point of Indium and Lead at 156.6° C. and 327.47° C., respectively, and heat of fusion of Indium at 28.71 J/g. Instrument is checked weekly. Specimen of ground pellets (a quick single pass grind on a Wiley mill) of about 8.0 mg is scanned at a rate of 20° C./minute in the presence of Nitrogen with a flow rate of 25 c.c./minute according to the manufacturer's recommendation.

2. Tare a TA's aluminum pan and lid on a balance. Prepare a specimen inside the pan and weigh to about 8.0 mg. Cover the specimen with the lid.

3. Crimp the specimen between the pan and the lid on a TA's sample crimper.

4. Prepare an empty crimped aluminum pan and lid as reference.

5. Place the specimen and reference pans in the DSC cell at room temperature.

6. After the DSC is cooled to −5° C. using a cooling tank-LNCS, it will start to heat the specimen from −5° C. to 290° C. at a rate of 20° C./minute. Data will be saved for analysis.

DSC tests and resulting numbers described herein are conducted on particles directly from the production process. In other words, these particles have not been subjected to additional thermal treatment. Specifically, these particles have not been subjected to the typical drying that is done to remove absorbed moisture prior to melt processing.

In one embodiment, the polyester polymer particles exhibit at least two melting peaks. The low peak melting point is considered to be $T_{m1a}$ as explained further below, which is classified as a melting peak when the area under the heating curve on a DSC first heating scan is at least the absolute value of 1 J/g. If the area under the curve is less than 1 Joule per gram (J/g), the uncertainty around whether a curve is truly a peak or not becomes too high. Moreover, one can determine that at least two peaks exist when the endotherm(s) on a DSC scan exhibit at least four slopes, a first slope departing from a baseline, a second slope of opposite sign from the first slope, and a third slope of opposite sign from the second slope, and a fourth slope of opposite sign from the third slope. The temperature locations of the peaks on each curve define the melting points on that heating curve. For the purposes of computing the area of the melting endotherms, the dividing point between two peaks is at the point between the peaks where the curve most closely approaches the baseline.

In this embodiment, if two or more peaks appear on a heating curve from a DSC first heating scan, then the first peak is the low peak melting point $T_{m1a}$, and the second peak is the high peak melting point $T_{m1b}$ such that $T_{m1a}<T_{m1b}$. The low melting peak temperature can be within a range of from 190° C. to 250° C., 190° C. to 245° C., 190° C. to 240° C., or 190° C. to 235° C. For example, the low melting peak temperature can be greater than about 190° C., greater than about 195° C., greater than about 200° C., greater than about 205° C., greater than about 210° C., greater than about 215° C., greater than about 220° C., greater than about 225° C., greater than about 230° C., or greater than about 235° C. and having a melting endotherm area with an absolute value of at least about 1.0 J/g, at least 1.5 J/g, at least 2.0 J/g, at least 3.0 J/g, at least 4.0 J/g, at least 8.0 J/g, or at least 16.0 J/g.

In one embodiment, the polyester polymer particles prepared according to the present invention exhibit a single melting peak on a DSC first heating scan having a peak temperature greater than about 220° C., greater than about 225° C., greater than about 230° C., or greater than about 235° C. and having a melting endotherm area with an absolute value of at least about 1 Joule per gram (J/g), at least about 1.5 J/g, at least 2.0 J/g, at least 3.0 J/g, at least 4.0 J/g, at least 8.0 J/g, or at least 16.0 J/g. If the area under the curve is less than 1 J/g, the uncertainty around whether a curve is truly a peak or not becomes too high. Further, actually performing a DSC analysis on the particles is not necessary; rather, it is important only that the particles have the stated morphology. The stated analyses reveal the inherent properties of the polymer and need only be run to determine whether or not the polyester polymer has or does not have the stated characteristics.

In some cases, particularly at low crystallinity due to crystallization at relatively low temperatures and/or for short times, rearrangement of crystals can occur so rapidly in the DSC instrument during first heating scans with scan rates of 20° C./min that the low melting point is not detected. The low melting point can then be seen by increasing the temperature ramp rate of the DSC instrument and using smaller samples. If the sample has a low melting peak, it will be seen at higher scan rates. Scan rates up to 500° C./min can be used. For solid-stated samples that experienced relatively high temperatures for relatively long times and exhibit only a single melting peak at a 20° C./min scan rate, no low melting peak is expected even at higher scan rates.

In some instances, depending on the specific thermal history of the polyester resin pellets, the DSC heating curve obtained upon a DSC first heating scan may exhibit an endothermic shoulder on the low-temperature side of the principal endothermic melting peak rather than two separate and well defined melting peaks. A low-temperature endothermic shoulder of this type is defined by means of the curve obtained by taking the first derivative with respect to temperature of the original DSC curve. The shoulder appears as a peak in the derivative curve. With increasing temperature, the derivative curve departs the baseline (at temperature A) in the endothermic direction at a temperature greater than about 155° C., greater than 160° C., greater than about 165° C., greater than about 170° C., greater than about 175° C., greater than about 180° C., greater than about 185° C., greater than about 190° C., greater than about 200° C., greater than about 205° C., greater than about 210° C., greater than about 215° C., or greater than 220° C., then achieves a maximum displacement from the baseline, and then reverses direction and approaches or returns to the baseline but does not cross the baseline. At still higher temperatures, the derivative curve reverses direction (at temperature B) and again bends towards the endothermic direction, marking the beginning of the primary melting peak in the original DSC curve. The heat of melting represented by the shoulder corresponds to the area under the original DSC curve between temperatures A and B, and must be greater than or equal to the absolute value of 1 J/g to be considered a true shoulder. Those skilled in the art recognize that minor instrumental noise in the original DSC curve can appear as high-amplitude short-duration spikes in the derivative curve. Such noise can be filtered out by requiring that all features in the derivative curve spanning less than 5° C. be ignored.

Further, actually performing a DSC analysis on the particles is not necessary; rather, it is important only that the particles have the stated morphology. The stated analyses reveal the inherent properties of the polymer and need only be run to determine whether or not the polyester polymer has or does not have the stated characteristics.

In addition to exhibiting similar DSC curves and having similar melting points, the polyester polymer particles created in non-solid-stating production zone 22 can also have an onset-of-melt temperature ($T_{om}$) similar to the $T_{om}$ of conventionally processed polymer particles. In one embodiment, the polyester polymer particles can have an onset-of-melt temperature greater than about 165° C., greater than about 170° C., greater than about 175° C., greater than about 180° C., greater than about 185° C., greater than about 190° C., greater than about 200° C., greater than about 205° C., greater than about 210° C., greater than about 215° C., or greater than 220° C.

While several of the properties of polyester polymer particles produced according to one embodiment of the present invention closely resemble those of solid-stated polymer particles, the non-solid-stated particles also have several properties that distinguish them from solid-stated particles. For example, in one embodiment, the polyester polymer particles exiting particle production zone 22 can have an intrinsic viscosity (It.V.) that is within about 5 percent, within about 4 percent, within about 3 percent, within about 2 percent, within about 1 percent, or essentially the same as the It.V. of the polymer melt introduced into particle production zone 22. This is in direct contrast to solid-stating processes, which typically increase the It.V. of the particles by 10 percent or more.

In another embodiment, the non-solid-stated polyester polymer particles can have a lower degree of crystallinity than polymer particles formed in a solid-stating process. Typically, solid-stated polymer particles can have a degree of crystallinity greater than about 45 percent, while the polymer particles exiting production zone 22 can generally have a degree of crystallinity less than about 45 percent, less than about 44 percent, less than about 42 percent, in the range of from about 34 to about 42 percent, or about 36 to about 40 percent. Percent crystallinity as given here is calculated from DSC scan data.

In general, the crystallinity of the polymer particles can be determined using the above-described DSC first heating scan by first finding the difference between the absolute value of the area of the melting endotherm and the absolute value of the area of any crystallization exotherm(s). This difference corresponds to the net heat of melting and can generally be expressed in Joules/gram. The heat of melting of 100% crystalline PET can generally be taken to be 121 Joules/gram, so the weight fraction crystallinity of the pellet can be calculated as the net heat of melting divided by 121. The weight percent crystallinity is the weight fraction crystallinity expressed as a percentage.

In addition, because production zone 22 does not include a solid-state polymerization step, the resulting polymer particles can have significantly lower amounts of polycondensation catalyst than conventional solid-stated particles. Examples of polycondensation catalysts can include, but are not limited to, compounds of titanium, germanium, tin, aluminum, and/or Group I and II metals. The concentration of polycondensation catalyst is reported as the parts per million of metal atoms based on the weight of the polymer. The term "metal" does not imply a particular oxidation state. The polymer particles exiting production zone 22 can comprise less than 75 parts per million by weight (ppmw), less than about 50 ppmw, less than about 45 ppmw, less than about 40 ppmw, less than about 35 ppmw, less than about 30 ppmw, or less than 25 ppmw of one or more polycondensation catalyst metals.

In addition, because production zone 22 does not include a solid-state polymerization step, the resulting polymer particles can be essentially free of antimony compounds. The concentration of antimony catalyst is reported as the parts per million of metal antimony paste on the weight of the polymer. The term "metal" does not imply a particular oxidation state. The polymer particles exiting production zone 22 can comprise less than 150 parts per million by weight (ppmw), less than about 100 ppmw, less than about 75 ppmw, less than about 50 ppmw, less than about 10 ppmw, less than about 8 ppmw, or less than 4 ppmw of antimony metal.

Referring again to polymer production system 10 illustrated in FIG. 1, melt production zone 20 can be at least partly defined by or within any process capable of producing a polyester polymer melt from one or more starting materials. The type and state of starting materials is not limited; the polymer can undergo any melt history and can be in and/or can have passed through any state prior to being converted to a polymer melt in melt production zone 20. For example, in one embodiment, the polymer melt can be produced by melting solid polyester polymer particles in an extruder. In another embodiment, the polymer melt exiting melt production zone 20 can be directly withdrawn from a melt-phase polymerization reactor. The polymer melt can comprise any combination of virgin and/or scrap (i.e., recycle) polymer. The recycled polymer can include post-consumer recycle material. In one embodiment, the polymer melt exiting melt production zone 20 can comprise at least about 65 weight percent, at least about 75 weight percent, at least about 80 weight percent, at least about 85 weight percent, at least about 90 weight percent, at least about 95 weight percent, or substantially all virgin polyester polymer.

In one embodiment of the present invention, melt production zone 20 can comprise a melt-phase polymerization system capable of producing the polymer melt from one or more polyester precursors (i.e., reactants or starting materials). In one embodiment of the present invention, melt production facility can employ a two-stage melt-phase polymerization process. In the first stage, two or more starting materials can react to form monomers and/or oligomers. In the second stage, the monomers and/or oligomers can react further to form the final polyester melt. If the reactants entering the first stage include acid end groups, such as, for example, terephthalic or isophthalic acid, the first stage can be referred to as an "esterification" stage. If the reactants entering melt production zone 20 have methyl end groups, such as, for example, dimethyl terephthalate or dimethyl isophthalate, the first stage can be referred to as an "ester-exchange" or "trans-esterification" stage. For simplicity, the term "esterification" as used herein, includes both esterification and ester exchange reactions.

In one embodiment, esterification of two or more starting materials can be carried out in melt production zone 20 at a temperature in the range of from about 220° C. to about 305° C., about 235° C. to about 290° C., or 245° C. to 285° C. and a pressure less than about 25 psig, or in the range of from about 1 psig to about 10 psig, or 2 psig to 5 psig. In general, the average chain length of the monomer and/or oligomers exiting the esterification stage can be less than about 25 units, or from about 1 to about 20 units, or from 5 to 15 units.

Examples of suitable melt-phase esterification systems that can be employed in melt production zone 20 are described in U.S. Pat. Nos. 6,861,494 and 6,906,164 and copending U.S. patent application Ser. No. 11/635,411, the entire disclosures of which are incorporated herein by reference to the extent not inconsistent with the present disclosure.

The second stage of melt production zone 22 can be referred to as the polycondensation stage. The polycondensation stage can be a single step process or can be divided into a prepolycondensation (i.e., prepolymerization or prepolymer stage) and one or more final polycondensation (i.e., finishing) steps. Generally, longer chain polymers can be produced via a multi-step polycondensation process. In one embodiment, the polycondensation stage can be carried out at a temperature in the range of from about 220° C. to about 320° C., about 240° C. to about 300° C., or 270° C. to 295° C. and a sub-atmospheric (i.e., vacuum) pressure. When polycondensation is carried out in a multi-step process, the prepolymer reactor can convert the monomers and/or oligomers exiting the esterification stage into an oligomer having an average chain length in the range of from about 2 units to about 40 units, about 5 units to about 35 units, or 10 units to 30 units. The finisher reactor can then convert the oligomer into a final polymer melt having the desired chain length.

Examples of suitable melt-phase polymerization processes that can be employed in melt production zone 20 are described in U.S. Pat. Nos. 6,861,494 and 6,906,164, the entire disclosures of which are incorporated herein by reference to the extent not inconsistent with the present disclosure.

In one embodiment of the present invention, the polymer melt produced in melt production zone 20 can have an intrinsic viscosity (It.V.) of at least about 0.70 dL/g, at least about 0.71 dL/g, at least about 0.72 dL/g, at least about 0.73 dL/g, at least about 0.74 dL/g, at least about 0.75 dL/g, at least about 0.76 dL/g, at least about 0.77 dL/g, or at least 0.78 dL/g. In another embodiment, the It.V. of the polymer melt can be less than about 1.2 dL/g, less than about 1.15 dL/g, less than about 1.1 dL/g, or less than 1.05 dL/g. In another embodiment, the polymer melt produced in melt production zone 20 can have an intrinsic viscosity (It.V.) in the range of 0.65 dL/g to 1.2 dL/g, in the range of 0.65 dL/g to 1.15 dL/g, in the range of 0.65 dL/g to 1.1 dL/g, or in the range of 0.65 dL/g to 1.05 dL/g; in the range of 0.70 dL/g to 1.2 dL/g, in the range of 0.70 dL/g to 1.15 dL/g, in the range of 0.70 dL/g to 1.1 dL/g, or in the range of 0.70 dL/g to 1.05 dL/g; in the range of 0.72 dL/g to 1.2 dL/g, in the range of 0.72 dL/g to 1.15 dL/g, in the range of 0.72 dL/g to 1.1 dL/g, or in the range of 0.72 dL/g to 1.05 dL/g; in the range of 0.74 dL/g to 1.2 dL/g, in the range of 0.74 dL/g to 1.15 dL/g, in the range of 0.74 dL/g to 1.1 dL/g, or in the range of 0.74 dL/g to 1.05 dL/g; in the range of 0.76 dL/g to 1.2 dL/g, in the range of 0.76 dL/g to 1.15 dL/g, in the range of 0.76 dL/g to 1.1 dL/g, or in the range of 0.76 dL/g to 1.05 dL/g; or in the range of 0.78 dL/g to 1.2 dL/g, in the range of 0.78 dL/g to 1.15 dL/g, in the range of 0.78 dL/g to 1.1 dL/g, or in the range of 0.78 dL/g to 1.05 dL/g.

In general, the intrinsic viscosity values described throughout this description are set forth in dL/g units as calculated from the inherent viscosity measured at 25° C. in 60/40 wt/wt phenol/tetrachloroethane. The inherent viscosity is calculated from the measured solution viscosity. The following equations describe such solution viscosity measurements and subsequent calculations to Ih.V. and from Ih.V. to It.V:

$$\eta_{inh} = [\ln(t_s/t_o)]/C$$

where
$\eta_{inh}$=Inherent viscosity at 25° C. at a polymer concentration of 0.50 g/100 mL of 60% phenol and 40% 1,1,2,2-tetrachloroethane;
ln=Natural logarithm;
$t_s$=Sample flow time through a capillary tube;
$t_o$=Solvent-blank flow time through a capillary tube; and
C=Concentration of polymer in grams per 100 mL of solvent (0.50%).

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0}(\ln(\eta_r)/C)$$

where
$\eta_{int}$=Intrinsic viscosity;
$\eta_r$=Relative viscosity=$t_s/t_o$
$\eta_{sp}$=Specific viscosity=$\eta_r - 1$ Instrument calibration involves replicate testing of a standard reference material and then applying appropriate mathematical equations to produce the "accepted" Ih.V. values. In general, the calibration factor (CF) can be expressed according to the following equation: CF≈Accepted Ih.V. of Reference Material/Average of Replicate Determinations. The corrected Ih.V. can then be calculated by multiplying the calculated Ih.V. by the calibration factor. Finally, the intrinsic viscosity (It.V. or $\eta_{int}$) can then be estimated according to the Billmeyer equation:

$$\eta_{int} = 0.5[e^{0.5 \times \text{Corrected } Ih.V.} - 1] + (0.75 \times \text{Corrected } Ih.V.)$$

In one embodiment of the present invention, the polymer melt produced in melt production zone 20 and/or the polymer particles exiting particle production zone 22 can comprise alkylene terephthalate or alkylene napthalate repeat units in the polymer chain. According to one embodiment, the polyester polymer produced in melt production zone 20 can comprise: (a) a carboxylic acid component comprising at least about 80 mole percent, at least about 85 mole percent, at least about 90 mole percent, at least about 92 mole percent, or at least 96 mole percent of the residues of terephthalic acid, derivates of terephthalic acid, naphthalene-2,6-dicarboxylic acid, derivatives of naphthalene-2,6-dicarboxylic acid, or mixtures thereof, and (b) a hydroxyl component comprising at least about 80 mole percent, at least about 85 mole percent, at least about 90 mole percent, at least about 92 mole percent, or at least 96 mole percent of the residues of ethylene glycol or propane diol, wherein the percentages are based on 100 mole percent of carboxylic acid component residues and 100 mole percent of hydroxyl component residues in the polyester polymer. Examples of terephthalic acid and naphthalene dicarboxylic acid derivatives can include, but are not limited to, $C_1$ to $C_4$ dialkylterephthalates and $C_1$ to $C_4$ dialkylnaphthalates, such as dimethylterephthalate and 2,6-dimethylnaphthalate.

Typically, polyesters such as polyethylene terephthalate can be produced by first esterifying a diol (e.g., ethylene glycol) with a dicarboxylic acid (e.g., terephthalic acid in its free acid or $C_1$-$C_4$ dialkyl ester form) and then subsequently polycondensing the resulting ester monomer and/or oligomers to form the final polyester polymer. In one embodiment, more than one compound containing carboxylic acid group(s) or derivative(s) thereof can be esterified. All the compounds that enter the process containing carboxylic acid group(s) or derivative(s) thereof that become part of said polyester product comprise the "carboxylic acid component," and the individual mole percents of each of the compounds containing carboxylic acid group(s) or derivative(s) thereof sum to 100. The "residues" of the carboxylic acid components in the polymer melt and/or polymer pellets refers to the portion of the original components that remain in the polyester product after polycondensation. In general, the mole percentages of hydroxyl and carboxylic acid residues in the polymer products can be determined via proton NMR.

In one embodiment, the carboxylic acid component(s) can additionally include one or more additional modifier carboxylic acid compounds, such as, for example, monocarboxylic acid compounds, dicarboxylic acid compounds, and compounds with a higher number of carboxylic acid groups. Examples of suitable modifier carboxylic acid compounds can include, but are not limited to, aromatic dicarboxylic acids having in the range of from about 8 to about 14 carbon atoms, aliphatic dicarboxylic acids having in the range of from about 4 to about 12 carbon atoms, or cycloaliphatic dicarboxylic acids having in the range of from about 8 to about 12 carbon atoms. More specific examples of modifier dicarboxylic acids can include phthalic acid; isophthalic acid; naphthalene-2,6-dicarboxylic acid; cyclohexane-1,4-dicarboxylic acid; cyclohexanediacetic acid; diphenyl-4,4'-dicarboxylic acid; succinic acid; glutaric acid; adipic acid; azelaic acid; and sebacic acid. It should be understood that use of the corresponding acid anhydrides, esters, and acid chlorides of these acids is included in the term "carboxylic acid". It is also possible for tricarboxyl compounds and compounds with a higher number of carboxylic acid groups to be employed as modifiers.

In another embodiment, the hydroxyl component of the present polyester can include additional modifier mono-ols, diols, or other compounds with higher numbers of hydroxyl groups. Examples of modifier hydroxyl compounds can include, but are not limited to, cycloaliphatic diols having in the range of from about 6 to about 20 carbon atoms and/or aliphatic diols having in the range of from about 3 to about 20 carbon atoms. More specific examples of such diols can include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

Typically, the polymer melt exiting melt zone 20 illustrated in FIG. 1 can have a temperature in the range of from about 255° C. to about 315° C., about 260° C. to about 310° C., or 265° C. to about 305° C. and can be transported to particle production zone 22 by any mechanism known in the art. In one embodiment, the polymer melt is pumped via gear pump, extruder, or other suitable device to the inlet of particle production zone 22, which will now be described in further detail with reference to FIG. 2.

Figure 2:
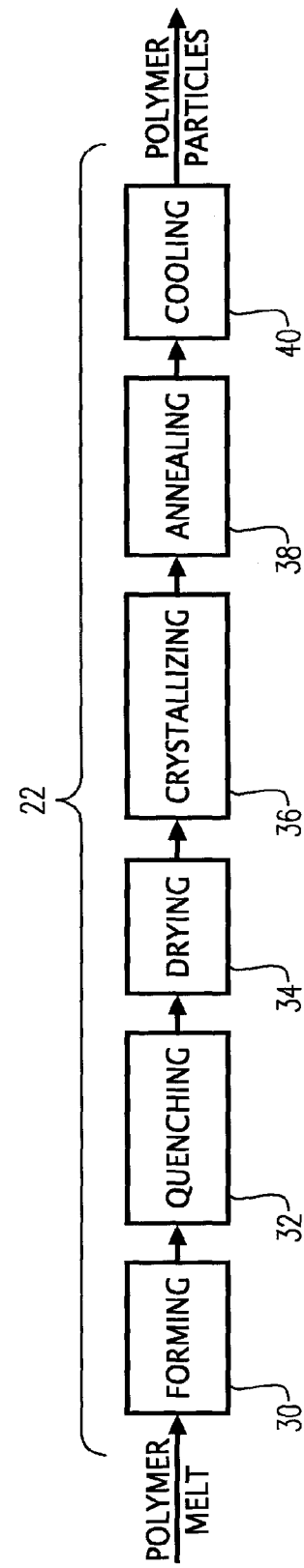
FIG. 2 is a simplified overview of the major steps involved in a non-solid-stating particle production stage configured in accordance with one embodiment of the present invention, particularly setting forth the forming, quenching, drying, crystallizing, annealing, and cooling steps of the particle production stage.

Turning now to FIG. 2, an overview of the primary steps of particle production zone 22, configured according to one embodiment of the present invention, is presented. In general, particle production zone 22 comprises a forming zone 30, a quenching zone 32, a drying zone 34, a crystallizing zone 36, an annealing zone 38, and a cooling zone 40. Polymer particles created in forming zone 30 can be contacted with a quench liquid in quenching zone 32 and can thereafter be dried in drying zone 34. The resulting dried particles can then be crystallized and annealed in respective crystallizing and annealing zones 36 and 38 before being cooled in cooling zone 40. Processing zones 30, 32, 34, 36, 38, and 40 will now be described in more detail below, beginning with forming zone 30.

In forming zone 30, a plurality of polyester polymer particles can be created from the polymer melt routed to particle production zone 22 from melt production zone 20, as illustrated in FIG. 1. Forming zone 30 can be defined by or within any system capable of producing polymer particles from a polymer melt. In one embodiment, the molten polyester polymer having a temperature in the range of from about 265° C. to about 315° C., about 275° C. to about 305° C., or 280° C. to 295° C., can be passed by a gear pump or extruder through a die. As the formed polymer passes through the diehead, it may be cut to thereby form a plurality of initial polymer particles, which can thereafter be transported to quenching zone 32, as shown in FIG. 2.

Quenching zone 32 can be defined by or within any system suitable for contacting at least a portion of the initial polyester particles with a quench liquid to thereby provide cooled, quenched polymer particles. Typically, the quench liquid can have a temperature that is at least about 50° C., at least about 100° C. or at least 150° C. less than the average bulk temperature of the polymer immediately prior to contact with the quench liquid. In one embodiment, the quench liquid can comprise water and can have a temperature in the range of from about 40° C. to about 110° C., about 50° C. to about 100° C., or 70° C. to 95° C. Generally, the particles can have an average residence time in quenching zone 32 of less than about 30 seconds, less than about 20 seconds, less than about 10 seconds, less than about 5 seconds, less than about 3 seconds, or less than 2 seconds. The specific volume or volumetric flow rate of quench liquid required depends on a variety of factors (e.g., plant production rate and configuration), but can generally be sufficient to provide a particle slurry having a solids content in the range of from about 2 to about 50 weight percent, about 3 to about 45 weight percent, or 4 to 40 weight percent.

In one embodiment of the present invention, quenching zone 32 and forming zone 30 can be configured such that the forming and quenching of the polyester polymer particles can be carried out substantially simultaneously. For example, in one embodiment, the polymer melt can be cut as it passes through the diehead, which can be submerged in a quench liquid to thereby provide a plurality of quenched particles. In general, at least a portion of the quenched particles can exhibit a cooler, more crystalline zone near the exterior of the particle (i.e., a shell) and a warmer, relatively amorphous region near the particle center (i.e., a core). In one embodiment, at least a portion of the shell can exhibit strain-induced crystallinity.

The presence of the strain-induced semicrystalline shell is easily detected by use of microscopy. The existence of a shell is clear from simple observation of pellets using an optical or scanning electron microscope. In one embodiment, the shell is discontinuous and is not present on some portions of the pellet surface, and the edges of the shell are very evident in these areas. The strain-induced semicrystalline nature of the shell can be confirmed by observing pellets which have been thoroughly quenched immediately after cutting so as to prevent the spherulitic crystallization of the core. These pellets are transparent to the eye and when observed with an optical microscope using unmodified light they appear to be completely amorphous. However, when observed in an optical microscope between crossed polarizers the pellet appearance is characterized by the colored patterns characteristic of birefringence, indicating preferential orientation of the polymer chains. Also, the shell can be stripped from the core by means of aggressive mechanical abrasion and when these isolated shells are observed in an optical microscope between crossed polarizers they also exhibit the colored patterns indicative of birefringence. Furthermore, when these isolated shells are heated in a DSC there is little or no crystallization exotherm present upon heating but a large melting endotherm is present, demonstrating that the shells were substantially crystalline prior to heating in the DSC. These results make it clear to one skilled in the art that the shells are composed of semicrystalline polymer having a strain or orientation induced crystalline morphology. When this test method is applied to particles taken from the quench zone, the strain induced crystallization of the shell is readily apparent. The same test methods can also be used on the final product. Spherulitic crystallinity of the core can be seen under cross polarizers as a Maltese cross pattern.

One skilled in the art will recognize that a temperature difference described above between a zone near the exterior of the particle and a region near the particle center is a dynamic phenomenon. For example, if the quenched particles remained in the quenched liquid for a sufficient amount of time, the exterior and center of each particle would equilibrate to a temperature that would match the quench liquid.

The average bulk temperature of the polyester particles can be measured by taking a sample of at least 10 particles at any point in the process, inserting a temperature measurement device into the sample, and reading the temperature within 30-60 seconds from the time the particles exit the process. Alternatively, the sample temperature can be measured using an IR pyrometer "gun" or other temperature measurement device. To ensure a representative temperature measurement of the particles in quenching zone 32, the quench liquid should be removed from the particles prior to the temperature measurement.

As illustrated in FIG. 2, the slurry of quenched particles exiting zone 32 can then be routed to a drying zone 34, wherein at least a portion of the quench liquid can be separated from the particles. In one embodiment, drying zone 34 can be capable of separating at least about 80 weight percent, at least about 85 weight percent, at least about 90 weight percent, at least about 95 weight percent, at least about 98 weight percent, or at least 99 weight percent of the quench liquid from the polymer particles in less than about 1 minute, less than about 30 seconds, less than about 20 seconds, less than about 10 seconds, less than about 5 seconds, less than about 3 seconds, or less than about 2 seconds.

Drying zone 34 can be defined by or within any type of suitable particle dryer. For example, in one embodiment, the dryer can be a thermal dryer. In a thermal dryer, at least a portion of the liquid removal from the particles is accomplished via direct or indirect heat exchange with a warmed heat transfer medium. Examples of suitable thermal dryers include, but are not limited to, rotary dryers, flash dryers, fluidized and vibrating fluidized bed dryers, paddle dryers, plate dryers, and spiral dryers. In another embodiment, the at least a portion of the drying step carried out in drying zone 34 can be accomplished in a mechanical dryer. In a mechanical dryer, liquid is separated from the particles without the addition of a substantial amount of external thermal energy. In general, mechanical dryers can require less than about 100, less than about 50, less than about 20, less than about 10, or less than 1 BTU of thermal energy per pound of polymer (BTU/lb) to dry the polymer particles as described above. Examples of mechanical dryers can include, but are not limited to, spray dryers and centrifugal dryers.

In one embodiment of the present invention, the total time that the particles are immersed in the quench liquid (i.e., the quench time) can be less than about 1 minute, less than about 30 seconds, less than about 20 seconds, less than about 15 seconds, less than about 10 seconds, less than about 5 seconds, or less than 4 seconds. By minimizing the quench time, the average bulk temperature of the particles can be maintained above about than 150° C., 155° C., above about 160° C., above about 165° C., above about 170° C., above about 172° C., above about 175° C., above 178° C. at all points during and between forming zone 30 and drying zone 34. As a result, the dried particles introduced into crystallizing zone 36 can have an average bulk temperature in the range of from about 155° C. to about 210° C., about 165° C. to about 205° C., about 170° C. to about 200° C., or 175° C. to 195° C.

In general, crystallizing zone 36 can be operable to increase the particle average bulk temperature so that the crystallized particles exiting crystallizing zone 36 can have an average bulk temperature that is at least about 5° C., at least about 10° C., at least about 12° C., or at least 15° C. higher than the average bulk temperature of the dried particles entering crystallizing zone 36. Typically, the average bulk temperature of the crystallized particles exiting crystallizing zone 36 can be greater than about 155° C., greater than about 160° C., greater than about 165° C., greater than about 170° C., greater than about 172° C., greater than about 174° C., greater than about 176° C., greater than about 178° C., greater than about 180° C., greater than about 182° C., greater than about 185° C., greater than about 187° C., greater than about 188° C., greater than about 189° C., greater than about 190° C., or greater than about 192° C. In general, the average bulk temperature of the crystallized particles exiting crystallizing zone 36 does not exceed about 220° C., about 210° C., or about 205° C. The pressure in crystallizing zone 36 can be less than about 15 psig, less than about 10 psig, less than about 5 psig, less than about 2 psig, approximately atmospheric, or at a slight vacuum (i.e., in the range from about 700 mm Hg to about 760 mm Hg, about 650 mm Hg to about 760 mm Hg, or about 600 mm Hg to about 760 mm Hg).

Crystallizing zone 36 can be defined by or within any type of crystallizer capable of imparting a desired level of crystallinity to the particles passing therethrough. In general, the crystallizer can be a single-stage or multi-stage crystallizer that employs one or more types of crystallization, such as, for example, thermal crystallization or latent heat crystallization. A thermal crystallizer utilizes heat from an external source to further crystallize the polymer, while a latent heat crystallizer relies on the intrinsic energy of the particles themselves to promote crystallization. Both thermal and latent heat crystallization can be carried out in either a gas-phase or a liquid-phase atmosphere. Generally, the average temperature of the atmosphere within a thermal crystallizer is at least about 1° C., at least about 2° C., at least about 5° C., or at least 10° C. warmer than the average bulk temperature of the particles passing therethrough, while the average temperature of the atmosphere within a latent heat crystallizer is at least about 1° C., at least about 2° C., at least about 5° C., or at least 10° C. cooler than the average bulk temperature of the particles passing therethrough.

The specific configuration of the crystallizer associated with crystallizing zone 36 can vary. In one embodiment, the crystallizer can be a mechanically agitated crystallizer, while in another embodiment, the crystallizer can employ substantially no agitation. The crystallizer can be oriented in a generally horizontally, generally vertically, or at any angle therebetween. In one embodiment, the polymer particles have an average residence time in crystallizing zone 36 of less than about 30 minutes, less than about 20 minutes, less than about 15 minutes, less than about 10 minutes, or less than 5 minutes. At least a portion of the resulting crystallized particles exiting crystallizing zone 36 can subsequently be routed to annealing zone 38, as shown in FIG. 2.

Annealing zone 38 can be at least partially defined by or within any system capable of increasing the onset-of-melt temperature of the crystallized particles without causing the particles to undergo additional significant polymerization. In one embodiment of the present invention, the annealed particles exiting annealing zone 38 can have an onset-of-melt temperature and/or peak melting temperature that is at least about 5° C., at least about 10° C., at least about 12° C., or at least 15° C. greater than the onset-of-melt temperature and/or peak melting temperature, respectively, of the crystallized particles entering annealing zone 38. In general, the It.V. of the annealed particles changes by less than about 5 percent, less than about 3 percent, less than about 2 percent, or less than 1 percent as compared to the It.V. of the crystallized particles entering annealing zone 38.

As noted above, crystallizing zone 36 can be defined by or within any type of crystallizer capable of imparting a desired level of crystallinity to the particles passing therethrough and annealing zone 38 can be at least partially defined by or within any system capable of increasing the onset-of-melt temperature of the crystallized particles without causing the particles to undergo additional significant polymerization. One skilled in the art would recognize that some increase in onset-of-melt temperature can occur in the crystallizing zone and some crystallization can occur in the annealing zone. Therefore, the crystallizing zone can be distinguished from the annealing zone in that more than half of the overall percent crystallinity of the polymer particles leaving the annealing zone is obtained in the crystallizing zone. One skilled in the art will also recognize that a single piece of equipment can be part of the crystallizing zone and the annealing zone. For example, in one embodiment, particles with a low level of crystallinity enter a vessel forming a particle bed wherein a portion of the particle bed is in the crystallizing zone and the remainder of the particle bed is in the annealing zone. These particles may enter the crystallizing zone directly from the drying zone without any mechanical agitations in the crystallizing zone.

The average bulk temperature of the annealed particles withdrawn from annealing zone 38 can be either greater than or less than the average bulk temperature of the crystallized particles introduced at thereto. The small amount of heat of crystallization competes with the slight cooling caused by the optional stripping gas and normal heat loss to the environment. In one embodiment, the average bulk temperature of the annealed particles withdrawn from annealing zone 38 can be less than the average bulk temperature of the crystallized particles introduced thereto by an amount in the range of from about 0.5° C. to about 10° C., about 1° C. to about 5° C., or 2° C. to 4° C. In another embodiment, the average bulk temperature of the annealed particles withdrawn from annealing zone 38 can be greater than the average bulk temperature of the crystallized particles introduced thereto by an amount in the range of from about 0.5° C. to about 10° C., about 1° C. to about 5° C., or 2° C. to 4° C. In general, the average particle residence time in annealing zone 38 can be in the range of from about 1 hour to about 100 hours, about 5 hours to about 35 hours, about 8 hours to about 25 hours, or 10 hours to 22 hours. Particle residence time in annealing zone 38 can also be 1 hour to 24 hours, 1 hour to 20 hours, 1 hour to 16 hours, 1 hour to 12 hours, 1 hour to 8 hours, 1 hour to 6 hours, 1 hour to 4 hours, or 1 hour to 2 hours; 2 hours to 24 hours, 2 hours to 20 hours, 2 hours to 16 hours, 2 hours to 8 hours, 2 hours to 6 hours, or 2 hours to 4 hours; 4 hours to 24 hours, 4 hours to 20 hours, 4 hours to 16 hours, 4 hours to 12 hours, 4 hours to 8 hours, or 4 hours to 6 hours; 6 hours to 24 hours, 6 hours to 20 hours, 6 hours to 16 hours, 6 hours to 12 hours, or 6 hours to 8 hours; or 8 hours to 24 hours, 8 hours to 20 hours, 8 hours to 16 hours, or 8 hours to 12 hours. Annealing zone 38 can typically be operated under a pressure of less than about 20 psig, or in the range of from about 0 psig to about 10 psig, or about 0 psig to about 5 psig.

In one embodiment of the present invention, annealing zone 38 can additionally comprise a stripping zone (not illustrated), wherein at least a portion of the particles in annealing zone 38 can be contacted with a stripping gas to thereby remove at least a portion of the residual volatile components associated with the particles. Examples of volatile components removed in the stripping zone include, for example, acetaldehyde (AA) and other undesirable reaction byproducts. In general, the annealed particles exiting annealing zone 38 can comprise less than about 20 ppmw, less than 15 ppmw, less than 10 ppmw, or less than 5 ppmw of residual AA and other volatile components, as measured by ASTM F2013-00, entitled "Determination of Residual Acetaldehyde in Polyethylene Terephthalate Bottle Polymer Using an Automated Static Head-Space Sampling Device and a Capillary GC with a Flame Ionization Detector".

In general, the stripping gas may contact the particles co-currently or counter-currently in a batchwise or continuous manner. Any type or amount of stripping gas can be used to remove the desired amount of volatile components from the polymer particles. Typically, the stripping gas can be a nitrogen-containing gas that is optionally dried prior to introduction into the stripping zone. In one embodiment, the stripping gas can comprise greater than about 75 mole percent, greater than about 80 mole percent, greater than about 85 mole percent, greater than about 90 mole percent, or greater than 95 mole percent nitrogen, with the balance, if any, being typical components found in air such as oxygen, argon, and/or carbon dioxide. The temperature of the stripping gas entering annealing zone 38 is not particularly limited. The temperature of the stripping gas entering annealing zone 38 can generally be less than about 45° C., or can be in the range of from about 0° C. to about 40° C. or in the range of 5° C. to 30° C. According to one embodiment, the ratio of the volumetric flow rate of the stripping gas to the mass of pellets in the stripping zone of annealing zone 38 can be in the range of from about 0.01:1 to about 1.0:1, about 0.05:1 to about 0.5:1, or 0.1:1 to 0.3:1 standard cubic feet (SCF) of gas per pounds (lbs) of polymer particles.

According to one embodiment, contacting the particles in annealing zone 38 with a stripping gas can be sufficient to remove a major portion of the residual acetaldehyde (AA) without adding one or more AA scavengers to the polymer melt and/or particles. In one embodiment, the stripping zone of annealing zone 38 can have an AA removal efficiency of at least about 75 percent, at least about 80 percent, at least about 90 percent, or at least 95 percent, wherein AA removal efficiency can be defined according to the following formula: (total mass of AA associated with the particles entering the stripping zone−total mass of AA associated with particles exiting the stripping zone)/(total mass of AA associated with the particles entering the stripping zone), expressed as a percentage.

In one embodiment of the present invention, the stripped, at least partially annealed particles exiting the stripping zone of annealing zone 38 can comprise less than about 250 ppmw, less than about 150 ppmw, less than about 100 ppmw, less than about 75 ppmw, less than about 50 ppmw, less than about 25 ppmw, less than about 20 ppmw, less than about 15 ppmw, less than 10 ppmw, less than about 5 ppmw, or substantially free of one or more AA scavengers. Examples of acetaldehyde scavengers can include, but are not limited to, 2-aminobenzamide, any known amino-terminated polyamides having a molecular weight of less than 25,000 g/mol, or less than 20,000 g/mol, or less than 12,000 g/mol. In one embodiment, the amino-terminated polyamides can be the reaction products of adipic acid with m-xylylene diamine thereby forming end groups, which form chemically-bound 'imines' with AA and removing it from the polymer particles.

As described previously, in one embodiment, at least a portion of the quenched particles exiting quenching zone 32 comprise a crystalline polymer shell that at least partially surrounds an amorphous, molten polymer core. As the particles are dried in zone 34, crystallized in zone 36, and/or annealed in zone 38, at least a portion of the amorphous core can undergo spherulitic crystallization, thereby providing annealed particles that can exhibit a shell at least partly formed by strain-induced crystallization and a core at least partially characterized by spherulitic crystallization.

In one embodiment of the present invention, the above-described particle production zone 22 can have substantially lower energy requirements than conventional solid-state particulation processes. For example, in one embodiment, the total amount of thermal energy required to operate one or more of zones 30, 32, 34, 36, and/or 38 can be less than about 100 BTU per pound of polymer (BTU/lb), less than about 75 BTU/lb, less than about 50 BTU/lb, less than 25 BTU/lb, less than 10 BTU/lb, or less than 5 BTU/lb.

As shown in FIG. 2, at least a portion of the annealed particles can be withdrawn from annealing zone 38 and can be routed to an optional cooling zone 40. Cooling zone 40 can be at least partially defined within or by any process capable of reducing the average bulk temperature of the annealed particles. In one embodiment, the average bulk temperature of the annealed particles entering cooling zone 40 can be in the range of from about 170° C. to about 205° C., about 175° C. to about 200° C., or about 180° C. to about 195° C. Cooling zone 40 can employ one or more cooling devices operable to cool the annealed particles by at least about 40° C., at least about 50° C., at least about 75° C., or at least 100° C. Examples of cooling devices can include, but are not limited to, air blowers, horizontal or vertical rotary paddles, vertical tube heat exchangers, plate heat exchangers, or any other device known in the art. Typically, the particles have an average residence time in cooling zone 40 of less than about 90 minutes, less than about 75 minutes, or less than about 60 minutes. The average bulk temperature of the cooled particles exiting cooling zone 40 can be in the range of from about 40° C. to about 100° C., about 50° C. to about 80° C., or 60° C. to 75° C.

In one embodiment, the cooled polyester polymer particles exiting cooling zone 40 comprise spheroidal polyester particles. Spheroidal particles can be spherical, nearly spherical, oval, elliptical, or globular in shape; spheroids may or may not have tails. In general, spheroidal particles are substantially, but imperfectly, spherical and can be clearly distinguishable from slabs, cylinders, pastilles, cones, rods, or other, irregular shaped particles having one or more corners. Spheroidal particles have several distinguishing characteristics. For example, spheroids generally define a longitudinal axis, Y, and a lateral axis, X, and the ratio of Y:X can typically be less than about 2 or less than about 1.5.

In general, spheroids can be characterized according to the following test: when 10.0 g of pellets are placed near one edge of a smooth horizontal steel plate in a grouping one pellet thick, and the plate is smoothly and gradually elevated at that edge to tilt the plate, spheroidal particles will roll from the plate such that no more than 0.5 g of pellets remain on the plate when the plate first makes an angle of 13 degrees with respect to the horizontal. In one embodiment, the spheroids have a peak mode in a roundness distribution less than 1.4, less than 1.3, or less than 1.2. The roundness of a spheroid is defined as perimeter$^2$/($4\pi \times$area). "Perimeter" and "area" are defined in the context of a cross-sectional view of a spheroid.

In one embodiment, at least a portion of the cooled particles exiting cooling zone 40 can have a number average weight in the range of from about 0.60 to about 2.5 grams per 50 particles (g/50), about 1.0 to about 2.0 g/50, or 1.4 to 1.8 g/50. The average particle size can be in the range of from about 1 to about 8 mm, about 1.5 to about 6 mm, or 2 to 5 mm. When the cooled particles comprise spheroidal particles, the average particle size can be defined as the average length of the longitudinal axis, Y.

In one embodiment of the present invention, the It.V. of the polyester particles exiting cooling zone 40 can be at least 0.72 dL/g, at least 0.75 dL/g, at least 0.78 dL/g, or at least 0.81 dL/g, and up to about 1.2 dL/g, or 1.1 dL/g. In addition, the polyester polymer particles can comprise the same carboxylic acid and hydroxyl components as the polymer melt introduced into particle production zone 22 as previously described.

Referring back to FIG. 1, at least a portion of the polymer particles exiting particle production zone 22 can be routed to article production zone 24 via any transportation mechanism known in the art. In one embodiment, the polymer particles can be packaged into a container, such as, for example, a storage silo, dryer hopper, or a shipping container. Particles packaged in a storage silo may be held for a period of time as they await shipment from one location to another. Polymer particles packaged in a dryer hopper can subsequently be fed to an extruder, wherein the particles can be melted and the corresponding polymer melt can be routed to article production zone 24 for further processing. Examples of shipping containers can include, for example, a Gaylord box, a crate, a railcar, a trailer that can be attached to a truck, a drum, or a cargo hold on a ship, and particles packaged therein can be transported to one or more article production zones that are located in the same general location, or, alternatively, in substantially different locations than particle production zone 22.

Article production zone 24 can be at least partially defined by or within any process capable of producing one or more types of polymer-containing articles from at least a portion of the polymer particles produced in production zone 22. Examples of articles produced can include, but are not limited to, beverage bottles, food containers, films, fibers, and other products. When the polymer particles are used in bottle production, the polymer particles entering article production zone 24 can be generally be melted and can thereafter molded into hollow preforms or "parisons" via an injection molding process. Next, the preforms can be blow molded into beverage bottles and other similar containers having a desired size and shape. Alternatively, or in addition, one or more other articles (e.g., food containers, consumer product containers, films, and fibers) can be produced in article production zone 24 according to any method known in the art.

Figure 3:
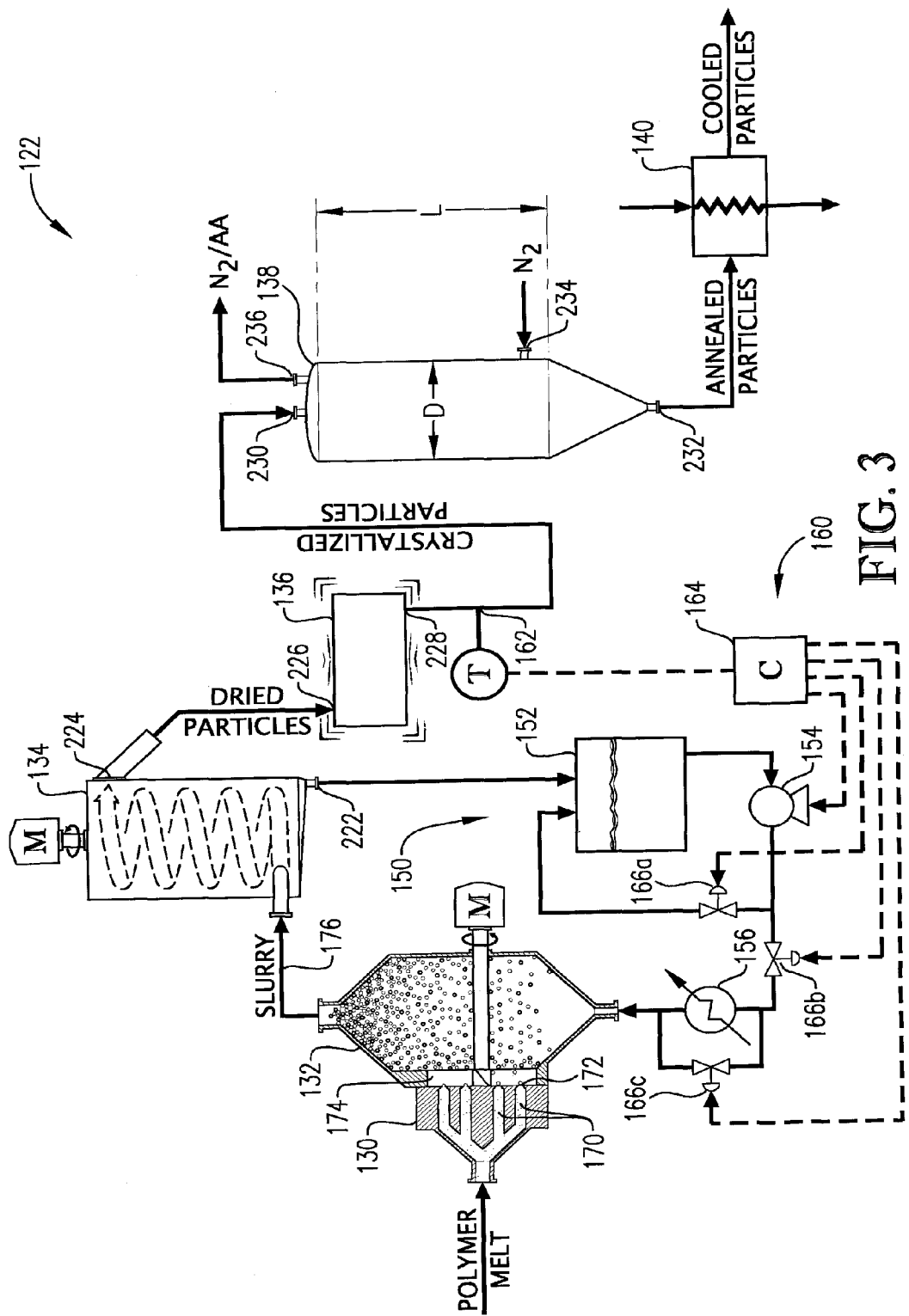
FIG. 3 is a schematic depiction of a specific equipment configuration capable of carrying out the particle production steps depicted in FIG. 2 in accordance with one embodiment of the present invention.

Turning now to FIG. 3, a specific equipment configuration suitable for carrying out the steps of particle production zone 22 described previously with respect to FIG. 2 is presented. Particle production system 122 illustrated in FIG. 3 generally comprises a cutter 130, a quench vessel 132, a centrifugal particle dryer 134, a gas-atmosphere latent heat crystallizer 136, an annealer 138, and a particle cooler 140. In addition, the particle production system 122 depicted in FIG. 3 includes a quench liquid recycle system 150 and a particle temperature control system 160, both of which will be described in detail shortly.

Turning now to the operation of the process configuration depicted in FIG. 3, polymer melt exiting a melt production zone (not shown) can be routed to an inlet of cutter 130, wherein the molten polymer can travel through a plurality of chambers 170 before being extruded through a series of apertures 172. As the melt passes through the apertures 172, the polymer strand can immediately be cut via contact with a rotating blade 174. The resulting initial polymer particles can then be instantaneously transferred into quench vessel 132, wherein the particles can be immersed in a quench liquid (e.g., water). As shown in FIG. 3, the resulting slurry, which can have a solids content in the range of from about 2 to about 50 weight percent, about 3 to about 45 weight percent, or about 4 to about 40 weight percent, can exit an upper outlet of quench vessel 132 and can thereafter enter a slurry conduit 176.

In one embodiment, the residence time of the slurry in slurry conduit 176 can be minimized in order to maximize the average bulk temperature of the particles traveling therethrough. In one embodiment, the average particle residence time in slurry conduit can be less than about 10 seconds, less than about 5 seconds, less than about 4 seconds, less than about 3 seconds, less than about 2 seconds, or less than 1 second. One way to minimize residence time is to minimize the overall flow path of slurry conduit 176. By "flow path" it is meant the entire flow distance that the slurry travels, including both horizontal and vertical pipe distances. In one embodiment, the overall flow path length of slurry conduit 176 can be less than about 50 feet, less than about 40 feet, less than about 30 feet, less than about 25 feet, less than about 20 feet, less than about 10 feet, or less than 5 feet. Another way to minimize residence time is to maximize the flow velocity of the slurry passing therethrough. In one embodiment, the slurry can have a flow velocity greater than about 10 feet per second (ft/s), greater than about 20 ft/s, greater than about 25 ft/s, greater than about 30 ft/s, greater than about 35 ft/s, greater than about 40 ft/s, or greater than 45 ft/s. This is in direct contrast to conventional slurry transport velocities, which are generally less than about 8 feet per second.

Figure 5:
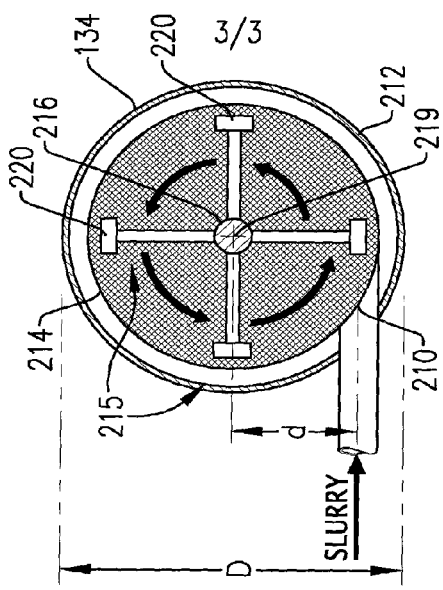
FIG. 5 is a sectional view of the centrifugal dryer of FIG. 4, particularly illustrating the tangential feeding of the slurring into the dryer in a discharge direction generally in the direction of rotation of the dryer rotor.
Figure 4:
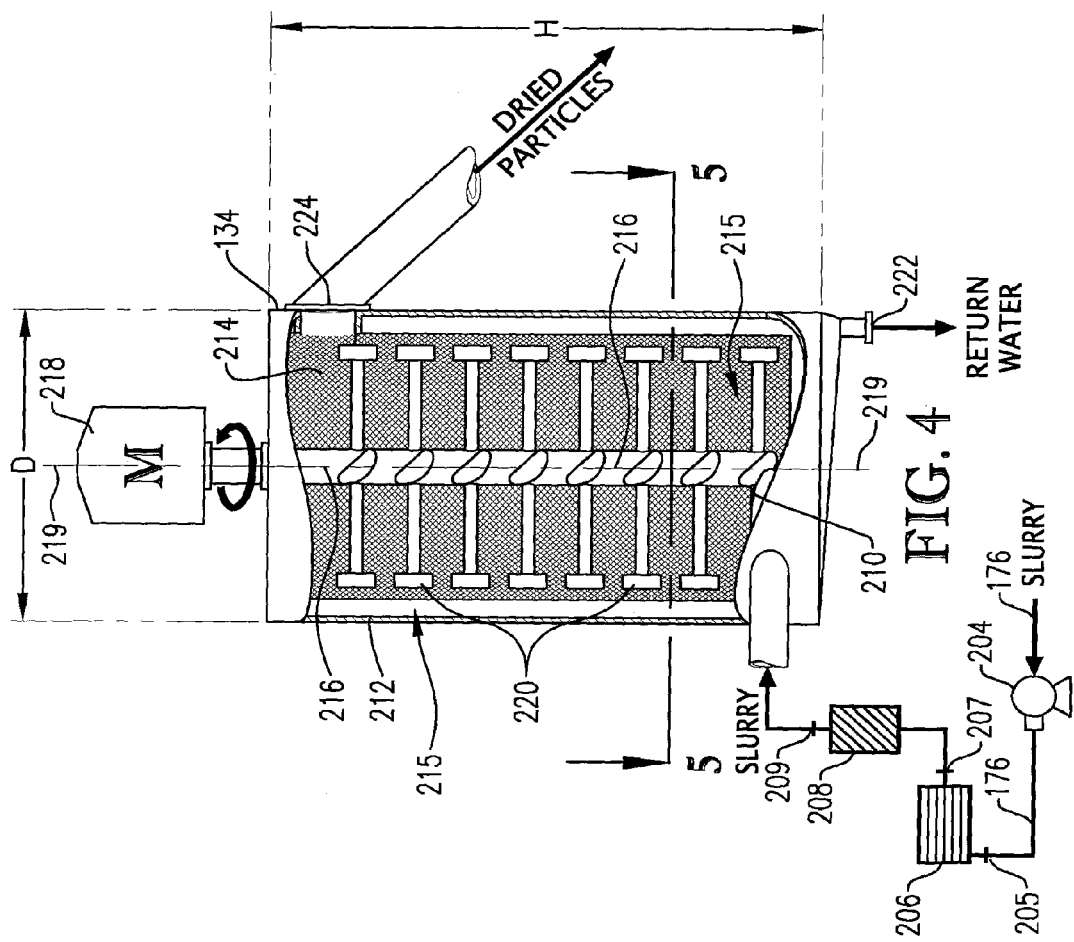
FIG. 4 is a side view of a centrifugal dryer for receiving a slurry containing polyester polymer particles and a quench liquid and separating the quench liquid from the particles.

As illustrated in FIG. 3, the particle slurry in slurry conduit 176 can then be introduced into centrifugal dryer 134, which is illustrated in greater detail in FIGS. 4 and 5. Turning now to FIG. 4, centrifugal dryer 134 is illustrated as generally comprising a slurry inlet 210, a housing 212, a screen 214, an upright rotor 215 that comprises a rotor shaft 216 and a plurality of paddles 220, a rotational power source 218, a separated liquid outlet 222, and a dried particle outlet 224. In addition, slurry conduit 176 is illustrated as further comprising a slurry pump 204, a particle filter 206, and a liquid removal device 208.

As shown in FIG. 4, the particle slurry in conduit 176 can be passed through optional particle filter 206 prior to entering centrifugal dryer 134. Particle filter 206 can define a slurry inlet 205, which can generally be positioned at a generally lower vertical elevation than a slurry outlet 207. In one embodiment, slurry entering slurry inlet 205 can be pumped or otherwise pressured upwardly through particle filter 206. In one embodiment, particle filter 206 can separate at least about 60 percent, at least about 75 percent, at least about 80 percent, or at least 90 percent of the total amount agglomerated chunks of particles from the slurry stream in conduit 176. The resulting particle slurry exiting slurry outlet 207 can then be passed through an optional liquid removal device 208, as shown in FIG. 4. In another embodiment (not shown), optional particle filter 206 can be located at the exit of dryer 134. The dried particle feed can generally be positioned at a generally higher vertical elevation that the particle exit.

Optional liquid removal device 208 can be any device capable of separating a major portion of the liquid in which the particles are immersed. In one embodiment, liquid removal device 208 can be operable to separate at least about 50 percent, at least about 65 percent, at least about 75 percent, at least about 85 percent, or at least about 90 percent of the liquid from the slurry thereby creating a concentrated slurry and a separated liquid stream. Typically, the concentrated slurry can have a solids content in the range of from about 25 to about 99 weight percent, about 40 to about 97 weight percent, or 75 to 95 weight percent. Examples of suitable liquid removal devices can include, but are not limited to, an angularly oriented screen or other small-mesh filters. Although depicted as two separate units, in one embodiment (not shown), liquid removal device 208 and particle filter 206 can be a single unit upstream of said dryer 134.

As shown in FIG. 4, the concentrated slurry exiting the slurry outlet 209 of liquid removal device 208 and can subsequently be introduced into centrifugal dryer 134. One embodiment of a specific slurry introduction system associated with centrifugal dryer 134 will be discussed in further detail shortly with respect to FIG. 5. Turning first to the configuration of centrifugal dryer 134 illustrated in FIG. 4, centrifugal dryer 134 can comprise a generally cylindrical screen 214 positioned inside of housing 212. The upright rotor 215 can be positioned inside screen 214 and can be rotated about axis of rotation 219 via a motor or other rotational power source 218. In one embodiment, the vertically and circumferentially spaced paddles 220 that extend outwardly from rotor shaft 216 can extend from a vertical position just above slurry inlet 210 to a vertical position just below dried particle outlet 224 along rotor shaft 216.

As illustrated in FIG. 4, centrifugal dryer 134 can define a maximum horizontal dimension (D) and a maximum vertical dimension (H). In one embodiment, the ratio of H:D can be in the range of from about 1.1:1 to about 20:1, about 1.5:1 to about 15:1, or about 2:1 to about 10:1. Generally, both D and H can be any length suitable for a particular facility or application. In one embodiment, H can be in the range of from about 0.5 to about 100 feet, about 2 to about 75 feet, or about 3 to about 50 feet. Similarly, in another embodiment, D can be in the range of from about 0.25 to about 80 feet, about 0.5 to about 50 feet, or about 2 to about 35 feet. As illustrated in FIG. 4, slurry inlet 210 can generally be positioned at a lower vertical elevation than dried particle outlet 224, so that the particle/liquid mixture passes generally upwardly through centrifugal dryer 134.

Referring now to FIG. 5, a sectional view of centrifugal dryer 134 taken along line 5-5 in FIG. 4 is presented. As shown in the embodiment depicted in FIG. 5, slurry inlet 210 can be located at a position offset from axis of rotation 219 by an offset distance (d). Typically, the ratio of the offset distance d to the maximum horizontal dimension D of centrifugal dryer 134 can be less than about 0.45:1, less than about 0.40:1, less than about 0.35:1, less than about 0.30:1, less than about 0.25:1, less than about 0.20:1, or less than 0.15:1. This is in direct contrast to conventional centrifugal pellet dryers, which typically position the slurry inlet directly in line the axis of rotation 219 of the upright rotor 215 (i.e., d=0).

The operation of centrifugal dryer 134 will now be described in more detail, beginning with the introduction of slurry into slurry inlet 210. In one embodiment, the slurry discharged through slurry inlet 210 can be introduced in a discharge direction that is generally in the same direction of rotation of upright rotor 215. In another embodiment, slurry discharged through slurry inlet 210 can be discharged into centrifugal dryer 134 generally tangentially to the inside of screen 214, as shown in FIG. 5. Typically, the slurry can be discharged into centrifugal dryer 134 at a slurry discharge speed, which can be less than about 75 percent, less than about 70 percent, less than about 65 percent, or less than 55 percent of the speed of the tips of paddles 220 (i.e., the tip speed). In general, the rotational speed of upright rotor 215 can generally be at least about 850 revolutions per minute (rpm), at least about 900 rpm, at least about 1,000 rpm, or at least 1,500 rpm.

Turning back to FIG. 4, as the particle slurry travels generally upwardly through dryer 134, the centrifugal force associated with rotating paddles 220 forces the liquid/particle mixture outwardly toward screen 214, which allows the liquid to pass through while retaining the particles on its interior surface. The dried particles rotate in an ascending route upwardly along the interior of screen 214, while the separated liquid falls downwardly in the region between housing 212 and screen 214. The liquid collects in the lower volume of the dryer and can be removed via liquid outlet 222, while the dried particles can be withdrawn in the upper region of dryer 134 via dried particle outlet 224.

Turning back to FIG. 3, at least a portion of the dried particles can thereafter be transported to a gas-atmosphere latent heat crystallizer 136. In one embodiment, crystallizer 136 can comprise a shaker deck crystallizer defining a dried particle inlet 226 and a crystallized particle outlet 228. Typically, shaker deck crystallizers can be horizontally oriented and can comprise a vibrationally moveable surface operable to transport at least a portion of the dried particles from inlet 226 to outlet 228. As the particles pass through crystallizer 136, at least a portion of the dried particles can undergo crystallization as discussed previously with respect to FIG. 2. As illustrated in FIG. 3, the crystallized particles exiting crystallized particle outlet 228 can then be introduced into an annealer 138, which additionally employs a nitrogen-containing stripping gas to remove at least a portion of the residual AA and other volatile contaminants from the particles therein.

Annealer 138 can be any vessel suitable for containing a plurality of particles and, optionally, allowing a gas stream to pass therethrough. In one embodiment, annealer 138 comprises a crystallized particle inlet 230, an annealed particle outlet 232, a stripping gas inlet 234, and a stripping gas outlet 236. In one embodiment, stripping gas inlet 234 and annealed particle outlet 232 can be located at a lower vertical elevation than crystallized particle inlet 230 and stripping gas outlet 236. Typically, stripping gas inlet 234 can be located at a vertical elevation corresponding to about 0.5 or about 0.25 the height of the particle bed within annealer 138. As illustrated in FIG. 3, crystallized particles introduced near the upper portion of annealer 138 via crystallized particle inlet move by gravity towards the lower portion of annealer 138, while the stripping gas contacts the falling particles in a countercurrent manner. As the particles accumulate to thereby form a particle bed, the bed slowly descends toward annealed particle outlet 232. Generally, the bed height is not limited, but can be at least about 50 percent, at least about 65 percent, or at least 75 percent of the maximum vertical distance (L) of annealer 138. In one embodiment, annealer 138 can have an aspect ratio (L:D) of at least about 2, at least about 4, or at least about 6.

As shown in FIG. 3, the annealed particles withdrawn from annealed particle outlet 232 of annealer 138 can subsequently be routed to cooler 140, wherein at least a portion of the particles can be cooled as described previously with respect to FIG. 2. Thereafter, the cooled particles can be routed to article production zone 24 as shown in FIG. 1, or otherwise stored or transported for subsequent processing and production.

Referring back to the separated liquid stream exiting liquid outlet 222 of centrifugal dryer 134 illustrated in FIG. 3, at least a portion of the separated liquid stream can be routed to quench liquid recycle system 150, which is illustrated as generally comprising a quench liquid surge tank 152, a recycle pump 154, and a quench cooler 156. In general, the separated liquid exiting centrifugal dryer 134 collects in quench surge tank 152. A recycle liquid stream withdrawn from a lower outlet of surge tank 152 can be routed to a suction port of recycle pump 154 prior to being discharged and routed through quench cooler 156. Typically, the separated liquid discharged from recycle pump 154 can have a temperature in the range of from about 80° C. to about 110° C., about 85° C. to about 105° C., or about 90° C. to about 100° C., and quench cooler 156 can be operable to reduce the temperature of the liquid by at least about 35° C., at least about 40° C., at least about 45° C., or at least 50° C. The cooled quench liquid exiting quench cooler 156 can then be routed to quench vessel 132 and can continue through the cycle as discussed previously.

In one embodiment of the present invention, particle production system 122 can additionally comprise a particle temperature control system 160, which can generally be integrated with quench liquid recycle system 150 to control the average bulk temperature of the particles during production. In one embodiment, the average bulk temperature of the particles can be maintained above at least about 155° C., at least about 160° C., at least about 165° C., at least about 170° C., at least about 175° C., or at least about 180° C. during all points of the particle production process from the introduction of the polymer melt into cutter 130 to the withdrawal of annealed particles from annealer 138.

In one embodiment illustrated in FIG. 3, particle temperature control system 160 generally comprises a downstream temperature indicator 162, a decision center 164, and a plurality of flow control valves 166a-c. In general, downstream temperature indicator 162 measures a temperature associated with the dried and/or crystallized particles respectively exiting dryer 134 and/or crystallizer 136. In one embodiment, the measured downstream temperature can be the particle average bulk temperature. In another embodiment, the measured downstream temperature can be a related downstream temperature, such as, for example, the temperature of the atmosphere surrounding the particles, or any other downstream temperature.

Once the downstream temperature has been measured, temperature indicator 162 transmits a signal to decision center 164, as illustrated by the dashed line in FIG. 3. In one embodiment, decision center 164 can compare the measured temperature to a target temperature to determine a difference. In one embodiment, the target temperature may be any temperature corresponding to a particle average bulk temperature in the range of from about 155° C. to about 215° C., about 170° C. to about 210° C., or 180° C. to 195° C. By "corresponding to," it is meant that the measured temperature is related to, but is not required to actually be, the particle average bulk temperature. In one embodiment, the measured temperature can be, for example, the temperature of the fluid medium surrounding the particles, which can be relatable to a certain particle average bulk temperature via experimental data or some other type of correlations.

Once decision center 164 has determined a difference between the measured temperature and the target temperature, decision center 164 can adjust the time that the particles exiting cutter 130 are immersed in the quench liquid. In general, if the determined difference is positive (i.e., the actual temperature is higher than the target temperature), decision center 164 may increase the contacting time between the quench liquid and the particles. If the determined difference is negative (i.e., the actual temperature is lower than the target temperature), decision center 164 can reduce the contact time between the quench liquid and the particles. In one embodiment, at least a portion of the comparison and/or adjusting carried out in decision center 164 can be manual (i.e., directly controlled by human intervention). In another embodiment, at least a portion of the comparison and/or adjusting carried out in decision center 164 can be automatic (i.e., controlled by an automated control system).

Several methods exist for adjusting the contact time between the quench liquid and the immersed particles and a few examples will be discussed with respect to FIG. 3. In one embodiment, the quench contact time can be adjusted by changing the speed of recycle pump 154. In another embodiment, quench contact time can be adjusted by changing the volumetric flow rate of the quench liquid introduced into quench vessel 132 and/or slurry conduit 176. In one embodiment, the volumetric flow rate of the quench liquid contacting the initial particles can be changed by varying the amount of recycle quench liquid diverted back into quench surge tank 152 by adjusting flow control valves 166a and 166b.

In another alternative or additional embodiment, the difference between the measured and target temperature can be minimized by adjusting the temperature of the quench liquid. In one embodiment, the temperature of the quench liquid can be adjusted by changing the amount of quench liquid bypassing quench cooler 156 by adjusting flow control valve 166c. In addition, additional heat exchangers (e.g., heaters and/or coolers) can be added to quench recycle system 150 in order to further control the temperature of the quench liquid entering quench vessel 132.

Once decision center 164 has caused one or more adjustments to be made, indicator 162 can measure the downstream temperature again and the process described above can be repeated. In one embodiment, the steps of measuring, comparing, and adjusting can be repeated until the difference between the target temperature and the measured temperature is less than about 10 percent, less than about 7 percent, less than about 5 percent, less than about 3 percent, or less than 1 percent of the target temperature.

EXAMPLES

The examples are all resins of PET. C1 was manufactured to a target PET composition with 1.5 wt. % DEG and 2.7 wt. % IPA. All other examples were manufactured to target PET compositions with 1.5 wt. % DEG and 2.5 wt. % IPA. The intrinsic viscosity target for each example was 0.84 dL/g. Comparative Examples are denoted by the letter "C" before the example number.

Example C1 was produced on a manufacturing line and is the only example subject to solid-state processing. All other examples were produced using a melt-phase only process. In other words, all examples except C1 were not solid-state polymerized. Example C2 was produced in a semi-works facility and the rest of the examples were produced on a manufacturing line.

A study was conducted comparing the solid stated resin, C1, melt phase only resin produced in the semiworks facility, C2, and melt phase only resin produced on a manufacturing line, Examples C3-C4 and 5-6. Examples C3-C4 and 5-6 were annealed during production at an exit temperature of 172° C. for approximately 18 hours. The annealing temperature was measured using a thermocouple inserted into pellets from the outflow of the annealer. Examples C4, 5, and 6 were subject to a secondary annealing step in a tumbling dryer. The dryer set points and actual pellet temperatures are given in Table 1. The pellet temperature was measured by taking a sample of pellets from the dryer in an insulated container and inserting a thermocouple into the pellets. The examples with the different processing histories had different low melting peak temperatures.

TABLE 1

| Secondary Annealing Conditions | | | |
|---|---|---|---|
| Example | Time | Oil Set Point Temperature | Pellet Temperature |
| C4 | 5.0 hr | 185° C. | 160° C. |
| 5 | 3.5 hr | 200° C. | 174° C. |
| 6 | 2.0 hr | 215° C. | 194° C. |
| 10 | 4.0 hr | 230° C. | 215° C. |

Examples C1-C4 and 5-6 were formed into preforms on a Husky XL-300 PET equipped with a 100 mm screw. Standard preform production settings would typically include a 555° F. barrel temperature set point, an 800 psi back pressure set point, and a 32 second injection molding cycle time set point. In order to accentuate the number of bubble defects, a set of bubble defects experiments were run with a 540° F. barrel temperature set point in each zone, a 300 psi back pressure set point, and a 30 second injection molding cycle time set point. Once the machine had stabilized to these settings, 4 shots were collected every 15 minutes for a total of 20 shots or 860 preforms for each example. The tests were repeated with the same settings and the same number of preforms collected later in the day.

On the same day, in order to accentuate the number of preform unmelt defects, a set of unmelt defects experiments were run with barrel temperature set points of 500° F., 515° F., 530° F., 540° F., 540° F., and 540° F. across zones 1-6, respectively; a 300 psi back pressure set point; and a 24.5 second injection molding cycle time set point. Once the machine had stabilized to these settings, 4 shots were collected every 15 minutes for a total of 20 shots or 860 preforms for each example. The tests were repeated with the same settings and the same number of preforms collected later in the day.

Results of the bubble defects experiments and unmelt defects experiments are shown in Table 2. Preforms were visually inspected for bubble defects and unmelt defects. The percent bubble defects is the percent of preforms containing one or more bubble defects. The percent unmelt defects is the percent of preforms containing one or more unmelt defects.

Note that C1, which was solid-stated, only had one melting peak temperature. Table 2 shows that the percent of preforms with at least one bubble defect decreases with increasing low melting peak temperature. Also, the percent of preforms with at least one unmelt defect generally decreases with increasing low melting peak temperature.

An additional test was run on each sample for an indication of bubble defects. The Examples were run through a Bekum Extrusion Blow Molding Machine using a 100 mm die at 100% open and at a 540° F. flat barrel temperature set point. To maintain the diameter of the extrudate, air at approximately 10 cubic feet per minute was applied. Material that was gathered for each Example over a 15 second increment was weighed and visually inspected for bubbles. The test was repeated three times at screw rates of 20 revolutions per minute (rpm), 30 rpm, and 40 rpm for each example. The result shown is the average bubbles per pound for all runs. For Example C1 only, the results are an average of several different sets of runs taken over several days. The number of bubble defects per pound of extrudate is given in Table 2.

Example 6 showed an unusually high percent of unmelt defects and an unusually high number of bubbles per pound. Material was produced on a manufacturing line at higher annealing temperatures so as to have a low melting peak temperature of 214° C., Example 7. Note this material was not subjected to the secondary annealing step used for Examples C4, and 5-6. Example 7 was subject to the same preform defect tests and bubble test on the Bekum Machine as Examples C1-C4 and 5-6 above. The preform data and number of bubble per pound are shown in Table 2.

Examples 8 and 9 are additional examples produced on the manufacturing line. Examples 8 and 9 were subject to the same preform defect tests and bubble test on the Bekum Machine as Examples C1-C4 and 5-6 above. The low melting peak temperature, preform defect data, and bubbles per pound are shown in Table 2.

Additional material from Example C2 was subjected to secondary annealing in a tumbling dryer at conditions shown in Table 1 as Example 10. Example 10 was subject to the same bubble test on the Bekum Machine as Examples C1-C4 and 5-6 above. Example 10 was not subject to the preform tests above.

TABLE 2

Preform Unmelt and Bubble Defects

| Example | Low Peak Melting Temperature | % Unmelt Defects | % Bubble Defects | Number of Bubbles per Pound |
|---|---|---|---|---|
| C1 | 245° C. | 5.7 | 4.3 | 1.8 |
| C2 | 189° C. | 15.2 | 16.5 | 27 |
| C3 | 189° C. | 16.5 | 11.4 | 30 |
| C4 | 191° C. | 15.8 | 10.0 | 25 |
| 5 | 197° C. | 8.0 | 9.2 | 18 |
| 6 | 215° C. | 14.1 | 7.1 | 13 |
| 7 | 214° C. | 5.5 | 2.2 | 2.5 |
| 8 | 220° C. | 6.9 | 0.5 | 2 |
| 9 | 231° C. | 3.4 | 1.2 | 1 |
| 10 | 241° C. | — | — | 0 |

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

DEFINITIONS

As used herein, the terms "a," "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "annealing" refers to any process that increases the onset-of-melt temperature of polyester polymer particles without or independent of further polycondensation.

As used herein, the term "average chain length" means the average number of repeating units in the polymer. For a polyester, average chain length means the number of repeating units based on the acid and alcohol reaction. Average chain length is synonymous with the number average degree of polymerization (DP). The average chain length can be determined by various means known to those skilled in the art. For example, 1H-NMR can be used to directly determine the chain length based upon end group analysis, and light scattering can be used to measure the weight average molecular weight with correlations used to determine the chain length. Chain length is often calculated based upon correlations with gel permeation chromatography (GPC) measurements and/or viscosity measurements.

As used herein, the term "bulk" refers to at least 10 isolated particles.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the term "esterification" refers to both esterification and ester exchange reactions.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the term "latent heat crystallization" refers to crystallization processes wherein the crystallization environment is maintained at or below the average bulk temperature of the particles.

As used herein, the term "liquid removal efficiency" can be expressed according to the following formula: (mass of liquid entering dryer with particle slurry−mass of liquid exiting dryer with dried particles)/(mass of liquid entering dryer with particle slurry), expressed as a percentage.

As used herein, the term "melt-phase" refers to the physical state of a polymer wherein at least a portion of the polymer is in the liquid phase.

As used herein, the term "non-solid-stated" refers to polyester polymer that has not undergone solid stated processing as defined below.

As used herein, the terms "non-solid-stating," and "non-solid-state processing" refer to processes that do not significantly increase the intrinsic viscosity of a polyester polymer through solid-state processing, as defined below.

As used herein, the terms "polyethylene terephthalate" and "PET" include PET homopolymers and PET copolymers.

As used herein, the terms "polyethylene terephthalate copolymer" and "PET copolymer" mean PET that has been modified by up to 20 mole percent with one or more added comonomers. For example, the terms "polyethylene terephthalate copolymer" and "PET copolymer" include PET modified with up to 20 mole percent isophthalic acid on a 100 mole percent carboxylic acid component basis. In another example, the terms "polyethylene terephthalate copolymer" and "PET copolymer" include PET modified with up to 20 mole percent 1,4-cyclohexane dimethanol (CHDM) on a 100 mole percent diol component basis.

As used herein, the term "polyester" refers not only to traditional polyesters, but also includes polyester derivatives, such as, for example, polyetheresters, polyester amides, and polyetherester amides.

As used herein, "predominately liquid" means more than 50 volume percent liquid.

As used herein, the term "residue" refers to the moiety that is the resulting product of the chemical species in a particular reaction scheme or subsequent formulation or chemical product, regardless of whether the moiety is actually obtained from the chemical species.

As used herein, the term "solid-stated" refers to polyester polymer that has undergone solid stated processing as defined below.

As used herein, the terms "solid-stating" and "solid-state processing" refer to the process of significantly increasing the intrinsic viscosity of a polyester polymer by subjecting solid polyester polymer to further polycondensation.

As used herein, the term "strain-induced crystallization" refers to the process of crystallizing a polyester polymer by applying strain to the polymer.

As used herein, the term "stripping" refers to the process of flowing a fluid through a plurality of polyester polymer particles to remove at least a portion of the residual contaminants present therein.

As used herein, the term "thermal crystallization" refers to crystallization processes wherein the crystallization environment is maintained above the average bulk temperature of the particles.

Non-Limiting Listing of Embodiments

In Embodiment A of the present invention, there is provided a polyester polymer production process comprising: (a) forming polyester polymer particles from a polyester polymer melt in a forming zone; (b) subsequent to step (a), quenching at least a portion of the particles via contact with a quench liquid in a quenching zone; (c) subsequent to step (b), drying at least a portion of the particles in a drying zone; (d) subsequent to step (c), crystallizing at least a portion of the particles in a crystallizing zone; and (e) subsequent to step (d), annealing at least a portion of the particles in an annealing zone, wherein at all points during and between steps (b) through (e) the average bulk temperature of the particles is maintained above 165° C.

The process of Embodiment A, wherein the polyester polymer melt has an intrinsic viscosity (It.V.) in the range of 0.70 dL/g to 1.2 dL/g, 0.70 dL/g to 1.1 dL/g, 0.72 dL/g to 1.2 dL/g, 0.72 dL/g to 1.1 dL/g, 0.76 dL/g to 1.2 dL/g, 0.76 dL/g to 1.1 dL/g, 0.78 dL/g to 1.2 dL/g, or 0.78 dL/g to 1.0 dL/g.

The process of Embodiment A or Embodiment A with any one or more of the intervening features, wherein said particles produced from said annealing zone, when measured on a first heating DSC scan, have a low melting peak temperature greater than 190° C., and a melting endotherm area greater than the absolute value of 1 J/g, 2 J/g, 4 J/g, 8 J/g, or 16 J/g.

The process of Embodiment A or Embodiment A with any one or more of the intervening features, wherein the It.V. of said particles produced from said forming zone is within about 5 percent of the It.V. of said particles produced from said annealing zone.

The process of Embodiment A or Embodiment A with any one or more of the intervening features, wherein said particles produced from said quenching zone comprise a shell and a core, wherein at least while said particles are within said quenching zone said shell is cooler and more crystalline than said core.

The process of Embodiment A or Embodiment A with any one or more of the intervening features, wherein steps (b) and (c) are carried out in a period of time less than 1 minute.

The process of Embodiment A or Embodiment A with any one or more of the intervening features, wherein said particles produced from said crystallizing zone have an average bulk temperature greater than 180° C.

The process of Embodiment A or Embodiment A with any one or more of the intervening features, wherein said particles introduced into said crystallizing zone have an average bulk temperature in the range of from about 170° C. to about 210° C.

The process of Embodiment A or Embodiment A with any one or more of the intervening features, wherein said crystallizing is carried out in a gas-phase atmosphere.

The process of Embodiment A or Embodiment A with any one or more of the intervening features, wherein the $T_{om}$ of said particles introduced into said annealing zone is at least 10° C. lower than the $T_{om}$ of said particles produced from said annealing zone.

The process of Embodiment A or Embodiment A with any one or more of the intervening features, wherein said particles produced from said annealing zone have a degree of crystallinity less than 42 percent.

The process of Embodiment A or Embodiment A with any one or more of the intervening features, wherein said crystallizing takes place at a pressure of less than 10 psig.

The process of Embodiment A or Embodiment A with any one or more of the intervening features, wherein said crystallizing does not include thermal crystallization.

The process of Embodiment A or Embodiment A with any one or more of the intervening features, wherein said particles produced from said crystallizing zone have an average bulk temperature that is at least 5° C. higher than the average bulk temperature of said particles introduced into said crystallizing zone.

The process of Embodiment A or Embodiment A with any one or more of the intervening features, wherein said particles have an average residence time in said crystallizing zone of less than 20 minutes.

The process of Embodiment A or Embodiment A with any one or more of the intervening features, wherein the average bulk temperature of said particles produced from said annealing zone is lower than the average bulk temperature of said particles introduced into said annealing zone.

The process of Embodiment A or Embodiment A with any one or more of the intervening features, wherein the average bulk temperature of said particles produced from said annealing zone is in the range of from about 0.5° C. to about 10° C. lower than the average bulk temperature of said particles introduced into said annealing zone.

The process of Embodiment A or Embodiment A with any one or more of the intervening features, wherein said particles have an average residence time in said drying zone of less than 1 minute.

The process of Embodiment A or Embodiment A with any one or more of the intervening features, wherein said drying zone is at least partially defined in a centrifugal-type dryer.

The process of Embodiment A or Embodiment A with any one or more of the intervening features, wherein at least a portion of said crystallizing zone is defined in a mechanically agitated crystallizer.

The process of Embodiment A or Embodiment A with any one or more of the intervening features, wherein at least a portion of said crystallizing zone is defined in a mechanically agitated crystallizer. Said crystallizer may be a shaker deck crystallizer.

The process of Embodiment A or Embodiment A with any one or more of the intervening features, wherein said particles have a residence time in said annealing zone of between 1 hour and 24 hours, 4 hours and 24 hours, or 8 hours and 24 hours.

The process of Embodiment A or Embodiment A with any one or more of the intervening features, wherein said particles produced from said annealing zone comprise a shell and a core, wherein said shell substantially surrounds said core, wherein at least a portion of said core was formed via spherulitic crystallization, wherein at least a portion of said shell was formed via strain-induced crystallization.

The process of Embodiment A or Embodiment A with any one or more of the intervening features, wherein said particles produced from said annealing zone have a spheroidal shape.

The process of Embodiment A or Embodiment A with any one or more of the intervening features, wherein said particles produced from said annealing zone comprise less than 8 ppm of antimony catalyst.

The process of Embodiment A or Embodiment A with any one or more of the intervening features, wherein said polyester polymer production process is not a solid-stating process.

The process of Embodiment A or Embodiment A with any one or more of the intervening features, wherein the total thermal energy added to said polyester polymer production process between steps (a) and (d) is less than 100 BTU/lb of said particles produced from said annealing zone.

The process of Embodiment A or Embodiment A with any one or more of the intervening features, wherein said polyester polymer melt comprises a carboxylic aid component and a hydroxyl component, wherein said carboxylic acid component comprises at least 80 mole percent of the residues of terephthalic acid and/or derivatives thereof, wherein said hydroxyl component comprises at least 80 mole percent of residues of ethylene glycol.

The process of Embodiment A or Embodiment A with any one or more of the intervening features, wherein said particles produced from said annealing zone, when measured on a first heating DSC scan, have a onset-of-melt temperature greater than 165° C., and a melting endotherm area greater the absolute value of 1 J/g, 2 J/g, 4 J/g, 8 J/g, or 16 J/g.

The process of Embodiment A or Embodiment A with any one or more of the intervening features, wherein the low melting peak temperature of said particles introduced into said annealing zone is at least 10° C. lower than the low melting peak temperature of said particles produced from said annealing zone.

In Embodiment B of the present invention, there is provided a polyester polymer production process comprising: (a) forming initial polyester polymer particles from a polymer melt having an intrinsic viscosity (It.V.) in the range of 0.70 dL/g to 1.2 dL/g, 0.70 dL/g to 1.1 dL/g, 0.72 dL/g to 1.2 dL/g, 0.72 dL/g to 1.1 dL/g, 0.76 dL/g to 1.2 dL/g, 0.76 dL/g to 1.1 dL/g, 0.78 dL/g to 1.2 dL/g, or 0.78 dL/g to 1.0 dL/g, wherein the initial particles comprise a shell and a core, wherein the shell is cooler and more crystalline than the core, wherein at least a portion of the shell exhibits strain-induced crystallinity; (b) drying at least a portion of the initial particles to thereby provide dried particles; (c) crystallizing at least a portion of the dried particles to thereby provide crystallized particles exhibiting both strain-induced crystallinity and spherulitic crystallinity; and (d) annealing at least a portion of the crystallized particles to thereby provide annealed particles, wherein the average bulk temperature of the initial particles and the dried particles is maintained above the onset-of-melting temperature ($T_{om}$) of the core.

The process of Embodiment B or Embodiment B with any one or more of the intervening features, wherein the average bulk temperature of said initial particles, said dried particles, and said crystallized particles is maintained at a temperature greater than 165° C.

The process of Embodiment B or Embodiment B with any one or more of the intervening features, wherein said particles produced from said annealing zone, when measured on a first heating DSC scan, have a low melting peak temperature greater than 190° C., and a melting endotherm area greater than the absolute value of 1 J/g, 2 J/g, 4 J/g, 8 J/g, or 16 J/g.

The process of Embodiment B or Embodiment B with any one or more of the intervening features, wherein the It.V. of said initial particles is within about 5 percent of the It.V. of said annealed particles.

The process of Embodiment B or Embodiment B with any one or more of the intervening features, further comprising, prior to step (b), quenching at least a portion of said initial particles via contact with a quench liquid to thereby provide quenched particles, wherein said initial particles dried in step (b) comprise at least a portion of said quenched particles.

The process of Embodiment B or Embodiment B with any one or more of the intervening features, further comprising, prior to step (b), quenching at least a portion of said initial particles via contact with a quench liquid to thereby provide quenched particles, wherein said initial particles dried in step (b) comprise at least a portion of said quenched particles and wherein said quenching is carried out in less than 30 seconds.

The process of Embodiment B or Embodiment B with any one or more of the intervening features, further comprising, prior to step (b), quenching at least a portion of said initial particles via contact with a quench liquid to thereby provide quenched particles, wherein said initial particles dried in step (b) comprise at least a portion of said quenched particles and wherein said quenching includes contacting said initial particles with said quench liquid in a quench vessel to thereby form a slurry, wherein said quenching includes transporting said slurry from said quench vessel to a drying zone via a slurry conduit, wherein the flow velocity of said slurry in said slurry conduit is greater than about 10 feet per second.

The process of Embodiment B or Embodiment B with any one or more of the intervening features, further comprising, prior to step (b), quenching at least a portion of said initial particles via contact with a quench liquid to thereby provide quenched particles, wherein said initial particles dried in step (b) comprise at least a portion of said quenched particles and wherein said quenching includes contacting said initial particles with said quench liquid in a quench vessel to thereby form a slurry, wherein said quenching includes transporting said slurry from said quench vessel to a drying zone via a slurry conduit, wherein the flow velocity of said slurry in said slurry conduit is greater than about 10 feet per second and wherein said slurry conduit has an overall flow path length less than 50 feet.

The process of Embodiment B or Embodiment B with any one or more of the intervening features, wherein said crystallization is carried out at a pressure of less than 10 psig.

The process of Embodiment B or Embodiment B with any one or more of the intervening features, wherein said crystallized particles have an average bulk temperature greater than 180° C.

The process of Embodiment B or Embodiment B with any one or more of the intervening features, wherein said crystallizing is carried out in a gas-phase latent heat crystallizer.

The process of Embodiment B or Embodiment B with any one or more of the intervening features, wherein said crystallizing does not include thermal crystallization.

The process of Embodiment B or Embodiment B with any one or more of the intervening features, wherein said crystallized particles exiting said crystallizing zone have an average bulk temperature that is at least 5° C. higher than said dried particles entering said crystallizing zone.

The process of Embodiment B or Embodiment B with any one or more of the intervening features, wherein said particles have an average residence time in said crystallizing zone of less than 20 minutes.

The process of Embodiment B or Embodiment B with any one or more of the intervening features, wherein said annealed particles have an average bulk temperature that is in the range of from about 0.5° C. to about 10° C. less than the average bulk temperature of said crystallized particles.

The process of Embodiment B or Embodiment B with any one or more of the intervening features, wherein said annealed particles comprise less than 8 ppm of antimony catalyst.

The process of Embodiment B or Embodiment B with any one or more of the intervening features, wherein said annealed particles have a $T_{om}$ that is at least 5° C. higher than the $T_{om}$ of said crystallized particles.

The process of Embodiment B or Embodiment B with any one or more of the intervening features, wherein said annealed particles have a degree of crystallinity in the range of from about 34 to about 42 percent.

The process of Embodiment B or Embodiment B with any one or more of the intervening features, wherein said shell substantially surrounds said core, wherein at least a portion of said initial particles are spheroidal.

The process of Embodiment B or Embodiment B with any one or more of the intervening features, wherein said polymer melt comprises a carboxylic acid component and a hydroxyl component, wherein said carboxylic acid component comprises at least 80 mole percent of the residues of terephthalic acid and/or derivatives thereof, wherein said hydroxyl component comprises at least 80 mole percent of residues of ethylene glycol.

The process of Embodiment B or Embodiment B with any one or more of the intervening features, wherein the total thermal energy added to said polyester polymer production process between steps (a) and (d) is less than 100 BTU/pound of said anneal particles.

The process of Embodiment B or Embodiment B with any one or more of the intervening features, wherein said particles produced from said annealing zone, when measured on a first heating DSC scan, have a onset-of-melt temperature greater than 165° C., and a melting endotherm area greater the absolute value of 1 J/g, 2 J/g, 4 J/g, 8 J/g, or 16 J/g.

In Embodiment C of the present invention, there is provided a polyester polymer production process comprising: (a) forming initial polyester polymer particles from a polymer melt having an intrinsic viscosity (It.V.) in the range of 0.70 dL/g to 1.2 dL/g, 0.70 dL/g to 1.1 dL/g, 0.72 dL/g to 1.2 dL/g, 0.72 dL/g to 1.1 dL/g, 0.76 dL/g to 1.2 dL/g, 0.76 dL/g to 1.1 dL/g, 0.78 dL/g to 1.2 dL/g, or 0.78 dL/g to 1.0 dL/g; (b) crystallizing at least a portion of the initial particles in a gas-atmosphere latent heat crystallizer to thereby provide crystallized particles, wherein the average bulk temperature of the crystallized particles exiting the latent heat crystallizer is greater than 185° C.; and (c) cooling at least a portion of the crystallized particles to thereby provide cooled particles, wherein the cooled particles have an onset-of-melting temperature ($T_{om}$) greater than 210° C., wherein the cooled particles exhibit only one melt peak having a melting endotherm area greater the absolute value of 1 J/g, 2 J/g, 4 J/g, 8 J/g, or 16 J/g when measured on a DSC first heating scan, wherein the one melt peak has a peak temperature greater than 190° C., wherein the cooled particles have a degree of crystallinity less than 42 percent.

The process of Embodiment C or Embodiment C with any one or more of the intervening features, further comprising, prior to cooling said crystallized particles, annealing at least a portion of said crystallized particles to thereby provide annealed particles, wherein at least a portion of said crystallized particles cooled in step (c) comprise at least a portion of said annealed particles.

The process of Embodiment C or Embodiment C with any one or more of the intervening features, wherein said annealing causes the $T_{om}$ of said crystallized particles to increase by at least 5° C.

The process of Embodiment C or Embodiment C with any one or more of the intervening features, wherein the average bulk temperature of said annealed particles is lower than the average bulk temperature of said crystallized particles.

The process of Embodiment C or Embodiment C with any one or more of the intervening features, wherein said annealing is carried out for between 1 hour and 24 hours, 4 hours and 24 hours, or 8 hours and 24 hours.

The process of Embodiment C or Embodiment C with any one or more of the intervening features, wherein the average bulk temperature of the initial particles is maintained at a temperature greater than about 165° C. during steps (a) and (b).

The process of Embodiment C or Embodiment C with any one or more of the intervening features, wherein said cooled particles have an It.V. within about 5 percent of the It.V. of said polymer melt.

The process of Embodiment C or Embodiment C with any one or more of the intervening features, wherein said crystallizing is carried out at a pressure less than about 15 psig.

The process of Embodiment C or Embodiment C with any one or more of the intervening features, wherein said forming of step (a) comprises pelletizing said polymer melt to thereby form said initial particles, and, simultaneously with said pelletizing, contacting at least a portion of said initial particles with a quench liquid to thereby form quenched initial particles.

The process of Embodiment C or Embodiment C with any one or more of the intervening features, wherein said quenched initial particles comprise a shell and a core, wherein said shell is cooler and more crystalline than said core, wherein at least a portion of said shell exhibits strain-induced crystallinity The process of Embodiment C or Embodiment C with any one or more of the intervening features, wherein said shell substantially surrounds said core.

The process of Embodiment C or Embodiment C with any one or more of the intervening features, wherein at least a portion of said core of said crystallized particles exhibit spherulitic crystallinity.

The process of Embodiment C or Embodiment C with any one or more of the intervening features, further comprising, drying at least a portion of said quenched initial particles to thereby provide dried initial particles.

The process of Embodiment C or Embodiment C with any one or more of the intervening features, wherein step (a) is carried out in less than 30 seconds.

The process of Embodiment C or Embodiment C with any one or more of the intervening features, wherein said crystallizing is carried out for less than 20 minutes.

The process of Embodiment C or Embodiment C with any one or more of the intervening features, wherein said crystallizing does not comprise thermal crystallization.

The process of Embodiment C or Embodiment C with any one or more of the intervening features, wherein the average bulk temperature of said initial particles entering said crystallizer is at least about 10° C. cooler than the average bulk temperature of said crystallized particles exiting said crystallizer.

The process of Embodiment C or Embodiment C with any one or more of the intervening features, wherein said crystallizer is a shaker deck crystallizer.

The process of Embodiment C or Embodiment C with any one or more of the intervening features, wherein said cooled particles comprise less than 10 ppm of antimony catalysts.

The process of Embodiment C or Embodiment C with any one or more of the intervening features, wherein said cooled particles have a degree of crystallinity in the range of from about 34 percent to about 42 percent.

The process of Embodiment C or Embodiment C with any one or more of the intervening features, wherein said melting peak temperature is greater than 235° C.

The process of Embodiment C or Embodiment C with any one or more of the intervening features, wherein said polymer melt comprises a carboxylic acid component and a hydroxyl component, wherein said carboxylic acid component comprises at least 80 mole percent of the residues of terephthalic acid and/or derivatives thereof, wherein said hydroxyl component comprises at least 80 mole percent of residues of ethylene glycol.

The process of Embodiment C or Embodiment C with any one or more of the intervening features, wherein said polymer melt comprises at least 75 percent virgin polymer.

The process of Embodiment C or Embodiment C with any one or more of the intervening features, wherein the total thermal energy added to said process during steps (a) through (c) is less than 100 BTU/lb of said crystallized particles.

The process of Embodiment C or Embodiment C with any one or more of the intervening features, wherein said annealed particles, when measured on a first heating DSC scan, have an onset-of-melt temperature greater than 165° C., and a melting endotherm area greater the absolute value of 1 J/g, 2 J/g, 4 J/g, 8 J/g, or 16 J/g.

The process of Embodiment C or Embodiment C with any one or more of the intervening features, wherein the low melting peak temperature of said crystallized particles is at least 10° C. lower than the low melting peak temperature of said annealed particles.

In Embodiment D of the present invention, there is provided a polyester polymer production process comprising: (a) forming initial polyester polymer particles from a polymer melt; (b) immersing at least a portion of the initial particles in a quench liquid to thereby form a particle slurry; (c) separating a substantial portion of the quench liquid from the initial particles to thereby provided dried particles; (d) crystallizing at least a portion of the dried particles in a crystallizer to thereby provide crystallized particles, wherein the average bulk temperature of the crystallized particles exiting the crystallizer is at least 185° C.; (e) annealing at least a portion of the crystallized particles to thereby provide annealed particles; and (f) cooling at least a portion of the annealed particles to thereby provide cooled particles, wherein the cooled particles have an intrinsic viscosity (It.V.) within 5 percent of the It.V. of the polyester polymer melt.

The process of Embodiment D or Embodiment D with any one or more of the intervening features, wherein said cooled particles when measured on a first heating DSC scan, have a low melting peak temperature greater than 190° C., and a melting endotherm area greater the absolute value of 1 J/g, 2 J/g, 4 J/g, 8 J/g, or 16 J/g.

The process of Embodiment D or Embodiment D with any one or more of the intervening features, wherein said cooled particles have a $T_{om}$ of at least about 165° C.

The process of Embodiment D or Embodiment D with any one or more of the intervening features, wherein said polymer melt has an It.V. in the range of 0.70 dL/g to 1.2 dL/g, 0.70 dL/g to 1.1 dL/g, 0.72 dL/g to 1.2 dL/g, 0.72 dL/g to 1.1 dL/g, 0.76 dL/g to 1.2 dL/g, 0.76 dL/g to 1.1 dL/g, 0.78 dL/g to 1.2 dL/g, or 0.78 dL/g to 1.0 dL/g.

The process of Embodiment D or Embodiment D with any one or more of the intervening features, wherein steps (b) and (c) can be carried out in a period of time less than about 30 seconds.

The process of Embodiment D or Embodiment D with any one or more of the intervening features, wherein the average bulk temperature of said initial particles and said dried particles is maintained above 165° C. at all points during steps (a)-(c).

The process of Embodiment D or Embodiment D with any one or more of the intervening features, wherein said crystallizing is carried out for less than 30 minutes.

The process of Embodiment D or Embodiment D with any one or more of the intervening features, wherein said crystallizer is a gas-atmosphere latent heat crystallizer.

The process of Embodiment D or Embodiment D with any one or more of the intervening features, wherein said crystallizer is a shaker deck crystallizer.

The process of Embodiment D or Embodiment D with any one or more of the intervening features, wherein said crystallizing is carried out at a pressure of less than 15 psig.

The process of Embodiment D or Embodiment D with any one or more of the intervening features, wherein the average bulk temperature of said crystallized particles is at least 10° C. greater than the average bulk temperature of said annealed particles.

The process of Embodiment D or Embodiment D with any one or more of the intervening features, wherein said annealed particles have a $T_{om}$ at least about 10° C. higher than the $T_{om}$ of said crystallized particles.

The process of Embodiment D or Embodiment D with any one or more of the intervening features, wherein said cooled particles have a degree of crystallinity less than 42 percent.

The process of Embodiment D or Embodiment D with any one or more of the intervening features, wherein said cooled particles comprise a shell and a core, wherein said shell substantially surrounds said core, wherein at least a portion of said shell exhibits strain-induced crystallinity, wherein at least a portion of said core exhibits spherulitic crystallinity.

The process of Embodiment D or Embodiment D with any one or more of the intervening features, wherein at least a portion of said cooled particles are spheroidal particles.

The process of Embodiment D or Embodiment D with any one or, more of the intervening features, wherein said cooled particles comprise less than 10 ppmw of antimony catalysts.

The process of Embodiment D or Embodiment D with any one or more of the intervening features, wherein said slurry flows through a slurry conduit, wherein the flow velocity of said slurry in said slurry conduit is greater than 10 feet per second.

The process of Embodiment D or Embodiment D with any one or more of the intervening features, wherein said slurry conduit has an overall flow path length less than 25 feet.

The process of Embodiment D or Embodiment D with any one or more of the intervening features, wherein at least a portion of said separating is carried out in a centrifugal dryer, wherein said particles have an average residence time in said dryer of less than 30 seconds.

The process of Embodiment D or Embodiment D with any one or more of the intervening features, wherein said annealing is carried out for between 1 hour and 24 hours, 4 hours and 24 hours, or 8 hours and 24 hours.

The process of Embodiment D or Embodiment D with any one or more of the intervening features, wherein said polymer melt comprises a carboxylic acid component and a hydroxyl component, wherein said carboxylic acid component comprises at least 80 mole percent of the residues of terephthalic acid and/or derivatives thereof, wherein said hydroxyl component comprises at least 80 mole percent of residues of ethylene glycol.

The process of Embodiment D or Embodiment D with any one or more of the intervening features, wherein the total thermal energy added to said process during steps (a) through (f) is less than 100 BTU/lb of said cooled particles.

The process of Embodiment D or Embodiment D with any one or more of the intervening features, wherein said annealed particles, when measured on a first heating DSC scan, have a onset-of-melt temperature greater than 165° C., and a melting endotherm area greater the absolute value of 1 J/g, 2 J/g, 4 J/g, 8 J/g, or 16 J/g.

In Embodiment E of the present invention, there is provided a polyester polymer production process comprising: (a) transporting a slurry comprising polyester polymer particles and a liquid through a slurry conduit coupled to a centrifugal particle dryer, wherein the dryer comprises a housing, a generally cylindrical screen located inside the housing, and a generally upright rotor configured to rotate inside the screen; (b) discharging the slurry through an inlet opening of the screen in a discharge direction offset from the axis of rotation of the rotor, wherein the discharge direction is generally in the direction of rotation of the rotor at the inlet opening; and (c) removing the quench liquid from the polymer particles in the particle dryer to thereby produce dried polyester polymer particles.

The process of Embodiment E or Embodiment E with any one or more of the intervening features, wherein said discharge direction is generally tangential to said screen.

The process of Embodiment E or Embodiment E with any one or more of the intervening features, wherein said slurry is discharged into said dryer at a slurry discharge speed, wherein said slurry discharge speed is less than 75 percent of the tip speed of said upright rotor.

The process of Embodiment E or Embodiment E with any one or more of the intervening features, wherein the rotational speed of said upright rotor is at least 850 revolutions per minute.

The process of Embodiment E or Embodiment E with any one or more of the intervening features, wherein the flow velocity of said slurry in said slurry conduit is greater than 10 feet per second.

The process of Embodiment E or Embodiment E with any one or more of the intervening features, wherein said slurry conduit defines an overall flow path that is less than 50 feet long.

The process of Embodiment E or Embodiment E with any one or more of the intervening features, wherein said slurry conduit further comprises a particle filter fluidly disposed upstream of said centrifugal dryer, wherein said particle filter is operable to trap agglomerated chunks of said polyester polymer particles.

The process of Embodiment E or Embodiment E with any one or more of the intervening features, wherein said slurry is passed through said particle filter in a generally upward direction.

The process of Embodiment E or Embodiment E with any one or more of the intervening features, wherein said slurry is pumped through said particle filter.

The process of Embodiment E or Embodiment E with any one or more of the intervening features, wherein said slurry conduit further comprises a liquid removal device, wherein said liquid removal device is operable to separate at least 50 weight percent of the total liquid from said slurry to thereby provide a concentrated slurry.

The process of Embodiment E or Embodiment E with any one or more of the intervening features, wherein said concentrated slurry has a solids content in the range of from about 25 to about 99 weight percent solids.

The process of Embodiment E or Embodiment E with any one or more of the intervening features, wherein said quench liquid comprises water.

The process of Embodiment E or Embodiment E with any one or more of the intervening features, wherein said slurry has a solids content in the range of from about 2 to about 50 weight percent.

The process of Embodiment E or Embodiment E with any one or more of the intervening features, wherein said polyester polymer particles have an average size in the range of from about 1 to about 8 millimeters.

The process of Embodiment E or Embodiment E with any one or more of the intervening features, wherein said quench liquid has an average temperature in the range of from about 80° C. to about 110° C.

The process of Embodiment E or Embodiment E with any one or more of the intervening features, wherein said dryer defines a maximum horizontal dimension (D) and a maximum vertical dimension (H), wherein said dryer has a H:D ratio in the range of from about 1.5:1 to about 20:1.

The process of Embodiment E or Embodiment E with any one or more of the intervening features, wherein H is in the range of from about 0.5 feet to about 100 feet, wherein D is in the range of from about 0.25 feet to about 80 feet.

The process of Embodiment E or Embodiment E with any one or more of the intervening features, wherein said dryer has a liquid removal efficiency greater than about 75 percent.

The process of Embodiment E or Embodiment E with any one or more of the intervening features, wherein said polyester polymer particles travel generally upwardly through said dryer during said removing of step (c).

The process of Embodiment E or Embodiment E with any one or more of the intervening features, further comprising crystallizing at least a portion of said dried particles in a latent heat crystallizer to thereby provide crystallized particles, wherein said dried particles entering said latent heat crystallizer have an average bulk temperature in the range of from about 170° C. to about 210° C., wherein said particles have an average residence time in said crystallizer of less than 30 minutes.

The process of Embodiment E or Embodiment E with any one or more of the intervening features, wherein said crystallizing is carried out at a pressure less than 15 psig.

The process of Embodiment E or Embodiment E with any one or more of the intervening features, wherein said crystallizer is a shaker deck crystallizer.

The process of Embodiment E or Embodiment E with any one or more of the intervening features, further comprising annealing at least a portion of said crystallized particles to thereby provide annealed particles.

The process of Embodiment E or Embodiment E with any one or more of the intervening features, wherein said annealing causes the onset-of-melting temperature ($T_{om}$) of said crystallized particles to increase by at least 5° C., wherein the average bulk temperature of said annealed particles is at least 5° C. cooler than the average bulk temperature of said crystallized particles.

The process of Embodiment E or Embodiment E with any one or more of the intervening features, wherein said annealed particles when measured on a first heating DSC scan, have a low melting peak temperature greater than 190° C., and a melting endotherm area greater the absolute value of 1 J/g, 2 J/g, 4 J/g, 8 J/g, or 16 J/g.

The process of Embodiment E or Embodiment E with any one or more of the intervening features, wherein said polyester polymer particles comprise a carboxylic acid component and a hydroxyl component, wherein said carboxylic acid component comprises at least 80 mole percent of the residues of terephthalic acid and/or derivatives thereof, wherein said hydroxyl component comprises at least 80 mole percent of residues of ethylene glycol.

The process of Embodiment E or Embodiment E with any one or more of the intervening features, wherein said annealed particles, when measured on a first heating DSC scan, have a onset-of-melt temperature greater than 165° C., and a melting endotherm area greater the absolute value of 1 J/g, 2 J/g, 4 J/g, 8 J/g, or 16 J/g.

In Embodiment F of the present invention, there is provided an apparatus for producing polyester polymer particles from a polyester melt. The apparatus comprises a cutter for cutting the polymer melt into particles, a quench zone for contacting the particles with a quench liquid, a dryer for removing the quench liquid from the particles, and a slurry conduit providing fluid flow communication between the quench zone and the dryer. The dryer is a centrifugal particle dryer comprising a housing, a generally cylindrical screen located in the housing, and a generally upright rotor configured to rotate inside the screen. The screen defines an inlet opening and the slurry conduit comprises a discharge section configured to discharge the slurry through the inlet opening. The slurry can be discharged in a discharge direction offset from the axis of rotation of the upright rotor in a direction that is generally in the direction of rotation of the rotor at the inlet opening.

The apparatus of Embodiment F or Embodiment F with any one or more of the intervening features, wherein said dryer further comprises a removed liquid conduit operable to withdraw at least a portion of the quench liquid removed from said particles, wherein said removed liquid conduit provides fluid flow communication between said dryer and said quench zone.

The apparatus of Embodiment F or Embodiment F with any one or more of the intervening features, further comprising a particle filter located upstream of said dryer and fluidly disposed in said slurry conduit, wherein said particle filter is operable to trap agglomerated chunks of said particles.

The apparatus of Embodiment F or Embodiment F with any one or more of the intervening features, wherein said particle filter defines a slurry inlet and a slurry outlet, wherein said slurry outlet is located at a higher vertical elevation than said slurry inlet.

The apparatus of Embodiment F or Embodiment F with any one or more of the intervening features, further comprising a quench liquid removal device fluidly disposed in said slurry conduit upstream of said dryer, wherein said quench liquid removal device comprises a liquid outlet.

The apparatus of Embodiment F or Embodiment F with any one or more of the intervening features, wherein said quench liquid removal device comprises an angularly oriented screen.

The apparatus of Embodiment F or Embodiment F with any one or more of the intervening features, wherein said dryer further comprises a dried particle outlet, wherein said dried particle outlet is positioned at a higher vertical elevation than said inlet opening of said screen.

The apparatus of Embodiment F or Embodiment F with any one or more of the intervening features, further comprising a latent heat crystallizer defining a dried particle inlet and a crystallized particle outlet, wherein said dried particle outlet of said dryer is in fluid flow communication with said dried particle inlet of said crystallizer.

The apparatus of Embodiment F or Embodiment F with any one or more of the intervening features, wherein said crystallizer comprises a shaker deck crystallizer.

The apparatus of Embodiment F or Embodiment F with any one or more of the intervening features, further comprising an annealer defining a crystallized particle inlet and an annealed particle outlet, wherein said crystallized particle outlet of said crystallizer is in fluid flow communication with said crystallized particle inlet of said annealer.

The apparatus of Embodiment F or Embodiment F with any one or more of the intervening features, wherein said dryer defines a maximum horizontal dimension (D) and a maximum vertical dimension (H), wherein said dryer has a H:D ratio in the range of from about 1.5:1 to about 20:1.

The apparatus of Embodiment F or Embodiment F with any one or more of the intervening features, wherein H is in the range of from about 0.5 feet to about 100 feet, wherein D is in the range of from about 0.25 feet to about 80 feet.

In Embodiment G of the present invention, there is provided a polyester polymer production process comprising: (a) forming initial polyester polymer particles from a polymer melt; (b) immersing at least a portion of the initial particles in a quench liquid to thereby provide a particle slurry; (c) separating a substantial portion of the quench liquid from the initial particles to thereby provide dried particles and separated quench liquid; (d) crystallizing at least a portion of the dried particles to thereby provide crystallized particles; (e) measuring a downstream temperature of the dried particles and/or the crystallized particles; and (f) adjusting the time that the initial particles are immersed in the quench liquid based on the downstream temperature.

The process of Embodiment G or Embodiment G with any one or more of the intervening features, further comprising, subsequent to said measuring of step (e), comparing said downstream temperature to a target temperature to determine a difference, wherein said adjusting of step (f) is carried out based on said difference.

The process of Embodiment G or Embodiment G with any one or more of the intervening features, wherein said target temperature corresponds to a particle average bulk temperature in the range of from 165° C. to 215° C.

The process of Embodiment G or Embodiment G with any one or more of the intervening features, further comprising repeating said measuring, comparing, and adjusting until said difference is less than 10 percent of said target temperature.

The process of Embodiment G or Embodiment G with any one or more of the intervening features, wherein at least a portion of said measuring, comparing, and/or adjusting is carried out by an automated control system.

The process of Embodiment G or Embodiment G with any one or more of the intervening features, wherein said adjusting of step (f) includes changing the volumetric flow rate of said quench liquid used to form said particle slurry of step (b).

The process of Embodiment G or Embodiment G with any one or more of the intervening features, wherein said initial particles are immersed in said quench liquid for less than 30 seconds.

The process of Embodiment G or Embodiment G with any one or more of the intervening features, further comprising transporting said particle slurry to a dryer via a slurry conduit, wherein at least a portion of said separating of step (c) is carried out in said dryer.

The process of Embodiment G or Embodiment G with any one or more of the intervening features, wherein said particle slurry in said slurry conduit has an average flow velocity greater than 10 feet per second.

The process of Embodiment G or Embodiment G with any one or more of the intervening features, wherein said transporting includes pumping said particle slurry through said slurry conduit into said dryer.

The process of Embodiment G or Embodiment G with any one or more of the intervening features, wherein said dryer is a centrifugal dryer, wherein said particle slurry is tangentially introduced into said dryer.

The process of Embodiment G or Embodiment G with any one or more of the intervening features, further comprising, subsequent to step (d), annealing at least a portion of said crystallized particles to thereby provide annealed particles.

The process of Embodiment G or Embodiment G with any one or more of the intervening features, wherein at least a portion of said crystallizing is carried out in a crystallizer, wherein at least a portion of said annealing is carried out in an annealer, wherein said downstream temperature is measured at a location downstream of said crystallizer and upstream of said annealer.

The process of Embodiment G or Embodiment G with any one or more of the intervening features, wherein said crystallizer is a shaker deck crystallizer.

The process of Embodiment G or Embodiment G with any one or more of the intervening features, wherein said annealing increases the onset-of-melting temperature ($T_{om}$) of said crystallized particles by at least 10° C.

The process of Embodiment G or Embodiment G with any one or more of the intervening features, wherein said annealing decreases the average bulk temperature of said crystallized particles by an amount in the range of from 0.5° C. to 10° C.

The process of Embodiment G or Embodiment G with any one or more of the intervening features, wherein said annealed particles comprise a shell and a core, wherein said shell substantially surrounds said core, wherein at least a portion of said core was formed via spherulitic crystallization, wherein at least a portion of said shell was formed via strain-induced crystallization, wherein at least a portion of said annealed particles have a spheroidal shape.

The process of Embodiment G or Embodiment G with any one or more of the intervening features, wherein at least a portion of said crystallizing of step (d) is carried out in a gas-phase atmosphere latent heat crystallizer, wherein said crystallized particles have an average bulk temperature that is at least about 5° C. higher than said dried particles.

The process of Embodiment G or Embodiment G with any one or more of the intervening features, wherein said crystallized particles have an average bulk temperature that is at least about 10° C. higher than said dried particles.

The process of Embodiment G or Embodiment G with any one or more of the intervening features, wherein said crystallizing of step (d) is carried out at a pressure of less than 10 psig.

The process of Embodiment G or Embodiment G with any one or more of the intervening features, wherein said crystallized particles have an average bulk temperature greater than 180° C.

The process of Embodiment G or Embodiment G with any one or more of the intervening features, wherein the average bulk temperature of the particles processed in steps (a) through (d) is maintained at a temperature greater than 160° C. at all points during steps (a) through (d).

The process of Embodiment G or Embodiment G with any one or more of the intervening features, further comprising, subsequent to said crystallizing of step (d), cooling at least a portion of said crystallized particles to thereby provide cooled particles having an average bulk temperature below 100° C.

The process of Embodiment G or Embodiment G with any one or more of the intervening features, wherein the intrinsic viscosity (It.V.) of said initial particles is within about 5 percent of the It.V. of said cooled particles.

The process of Embodiment G or Embodiment G with any one or more of the intervening features, wherein said cooled particles, when measured on a first heating DSC scan, have a low melting peak temperature greater than 190° C., and a melting endotherm area greater the absolute value of 1 J/g, 2 J/g, 4 J/g, 8 J/g, or 16 J/g.

The process of Embodiment G or Embodiment G with any one or more of the intervening features, wherein said cooled particles comprise less than 8 ppm of antimony catalyst.

The process of Embodiment G or Embodiment G with any one or more of the intervening features, wherein said cooled particles have a degree of crystallinity of less than 42 percent.

The process of Embodiment G or Embodiment G with any one or more of the intervening features, wherein said polymer melt has an intrinsic viscosity in the range of 0.70 dL/g to 1.2 dL/g, 0.70 dL/g to 1.1 dL/g, 0.72 dL/g to 1.2 dL/g, 0.72 dL/g to 1.1 dL/g, 0.76 dL/g to 1.2 dL/g, 0.76 dL/g to 1.1 dL/g, 0.78 dL/g to 1.2 dL/g, or 0.78 dL/g to 1.0 dL/g.

The process of Embodiment G or Embodiment G with any one or more of the intervening features, wherein said polymer melt comprises a carboxylic acid component and a hydroxyl component, wherein said carboxylic acid component comprises at least 80 mole percent of the residues of terephthalic acid and/or derivatives thereof, wherein said hydroxyl component comprises at least 80 mole percent of residues of ethylene glycol.

The process of Embodiment G or Embodiment G with any one or more of the intervening features, wherein the total thermal energy added to said process during steps (a) through (d) is less than 100 BTU/lb of said crystallized particles.

The process of Embodiment G or Embodiment G with any one or more of the intervening features, wherein said polyester polymer production process is not a solid-stating process.

In Embodiment H of the present invention, there is provided a polyester polymer production process comprising: (a) forming polyester polymer particles from a polyester polymer melt; (b) subsequent to step (a), transporting a slurry comprising at least a portion of the particles and a quench liquid through a conduit; (c) subsequent to step (b), introducing at least a portion of the slurry into a dryer; (d) subsequent to step (c), substantially separating the particles and the quench liquid in the dryer to thereby provide dried particles; (e) subsequent to step (d), crystallizing at least a portion of the dried particles to thereby provide crystallized particles; (f) subsequent to step (e), annealing at least a portion of the crystallized particles to thereby provide annealed particles; (g) subsequent to step (f), cooling at least a portion of the annealed particles to thereby provide cooled particles; (h) measuring a downstream temperature of the particles at a location downstream of the dryer and upstream of the annealer; and (i) adjusting the flow rate of the quench liquid though the conduit based on the downstream temperature.

The process of Embodiment H or Embodiment H with any one or more of the intervening features, wherein said slurry has a solids content in the range of from about 2 to about 50 weight percent.

The process of Embodiment H or Embodiment H with any one or more of the intervening features, wherein the average flow velocity of said slurry in said conduit is greater than 10 feet per second.

The process of Embodiment H or Embodiment H with any one or more of the intervening features, wherein said transporting of step (a) includes pumping said slurry through said conduit.

The process of Embodiment H or Embodiment H with any one or more of the intervening features, wherein said transporting of step (a) further comprises passing at least a portion of said slurry through a particle filter, wherein said particle filter is operable to trap agglomerated chunks of said polyester polymer particles.

The process of Embodiment H or Embodiment H with any one or more of the intervening features, wherein said passing of said slurry through said particle filter is carried out in a generally upward direction.

The process of Embodiment H or Embodiment H with any one or more of the intervening features, wherein said particles entering said dryer in said slurry have an average size in the range of from about 1 to about 8 millimeters.

The process of Embodiment H or Embodiment H with any one or more of the intervening features, wherein said separating of step (d) includes separating at least 85 percent of said quench liquid from said particles.

The process of Embodiment H or Embodiment H with any one or more of the intervening features, wherein at least a portion of said crystallizing of step (e) is carried out in a gas-phase atmosphere latent heat crystallizer, wherein said crystallized particles have an average bulk temperature that is at least about 10° C. higher than said dried particles.

The process of Embodiment H or Embodiment H with any one or more of the intervening features, wherein said crystallizer is a shaker deck crystallizer.

The process of Embodiment H or Embodiment H with any one or more of the intervening features, wherein said crystallized particles have an average bulk temperature greater than 180° C.

The process of Embodiment H or Embodiment H with any one or more of the intervening features, wherein said crystallizing is carried out at a pressure of less than 10 psig.

The process of Embodiment H or Embodiment H with any one or more of the intervening features, wherein said annealing increases the onset-of-melting temperature ($T_{om}$) of said crystallized particles by at least 10° C.

The process of Embodiment H or Embodiment H with any one or more of the intervening features, wherein said annealing decreases the average bulk temperature of said crystallized particles by an amount in the range of from about 0.5° C. to about 10° C.

The process of Embodiment H or Embodiment H with any one or more of the intervening features, wherein said annealed particles comprise a shell and a core, wherein said shell substantially surrounds said core, wherein at least a portion of said core was formed via spherulitic crystallization, wherein at least a portion of said shell was formed via strain-induced crystallization, wherein at least a portion of said annealed particles have a spheroidal shape.

The process of Embodiment H or Embodiment H with any one or more of the intervening features, wherein said polyester polymer particles are immersed in said quench liquid for less than 30 seconds.

The process of Embodiment H or Embodiment H with any one or more of the intervening features, wherein the average bulk temperature of the particles processed in steps (a) through (f) is maintained at a temperature greater than 165° C. at all points during steps (a) through (f).

The process of Embodiment H or Embodiment H with any one or more of the intervening features, wherein the intrinsic viscosity (It.V.) of said particles formed in step (a) is within about 5 percent of the It.V. of said cooled particles.

The process of Embodiment H or Embodiment H with any one or more of the intervening features, wherein said cooled particles, when measured on a first heating DSC scan, have a low melting peak temperature greater than 190° C., and a melting endotherm area greater the absolute value of 1 J/g, 2 J/g, 4 J/g, 8 J/g, or 16 J/g.

The process of Embodiment H or Embodiment H with any one or more of the intervening features, wherein said cooled particles have a degree of crystallinity less than 42 percent.

The process of Embodiment H or Embodiment H with any one or more of the intervening features, wherein said polymer melt has an It.V. in the range of 0.70 dL/g to 1.2 dL/g, 0.70 dL/g to 1.1 dL/g, 0.72 dL/g to 1.2 dL/g, 0.72 dL/g to 1.1 dL/g, 0.76 dL/g to 1.2 dL/g, 0.76 dL/g to 1.1 dL/g, 0.78 dL/g to 1.2 dL/g, or 0.78 dL/g to 1.0 dL/g.

The process of Embodiment H or Embodiment H with any one or more of the intervening features, wherein said polymer melt comprises a carboxylic acid component and a hydroxyl component, wherein said carboxylic acid component comprises at least 80 mole percent of the residues of terephthalic acid and/or derivatives thereof, wherein said hydroxyl component comprises at least 80 mole percent of residues of ethylene glycol.

The process of Embodiment H or Embodiment H with any one or more of the intervening features, wherein the total thermal energy added to said process during steps (a) through (g) is less than 100 BTU/lb of said cooled particles.

The process of Embodiment H or Embodiment H with any one or more of the intervening features, wherein said cooled particles, when measured on a first heating DSC scan, have a onset-of-melt temperature greater than 165° C., and a melting endotherm area greater the absolute value of 1 J/g, 2 J/g, 4 J/g, 8 J/g, or 16 J/g.

The process of Embodiment H or Embodiment H with any one or more of the intervening features, wherein said cooled particles, when measured on a first heating DSC scan, have a onset-of-melt temperature greater than 165° C., and a melting endotherm area greater the absolute value of 1 J/g, 2 J/g, 4 J/g, 8 J/g, or 16 J/g.

In Embodiment J of the present invention, there is provided a bulk of polyethylene terephthalate (PET) particles, wherein the PET particles have the following characteristics: (a) the particles comprise a shell and a core, wherein the shell substantially surrounds the core, wherein at least a portion of the shell exhibits strain-induced crystallinity and at least a portion of the core exhibits spherulitic crystallinity; (b) when measured on a first heating DSC scan, the particles have a low melting peak temperature greater than 200° C.; and a melting endotherm area greater than the absolute value of 1 J/g, 2 J/g, 4 J/g, 8 J/g, or 16 J/g, and (c) the particles have a degree of crystallinity less than 44 percent.

The particles of Embodiment J or Embodiment J with any one or more of the intervening features, wherein at least a portion of said particles are spheroidal.

The particles of Embodiment J or Embodiment J with any one or more of the intervening features, having a onset-of-melt temperature ($T_{om}$) greater than 165° C. or 175° C.

The particles of Embodiment J or Embodiment J with any one or more of the intervening features, wherein said particles comprise less than 10 ppmw of antimony catalyst.

The particles of Embodiment J or Embodiment J with any one or more of the intervening features, wherein said particles comprise less than 100 ppm of one or more acetaldehyde scavengers.

The particles of Embodiment J or Embodiment J with any one or more of the intervening features, wherein said particles are substantially free of one or more acetaldehyde scavengers.

The particles of Embodiment J or Embodiment J with any one or more of the intervening features, wherein said particles have an onset-of-melt temperature of greater than 175° C.

The particles of Embodiment J or Embodiment J with any one or more of the intervening features, wherein said particles have an intrinsic viscosity (It.V.) in the range of 0.70 dL/g to 1.2 dL/g, 0.70 dL/g to 1.1 dL/g, 0.72 dL/g to 1.2 dL/g, 0.72 dL/g to 1.1 dL/g, 0.76 dL/g to 1.2 dL/g, 0.76 dL/g to 1.1 dL/g, 0.78 dL/g to 1.2 dL/g, or 0.78 dL/g to 1.0 dL/g.

In Embodiment K of the present invention, there is provided a bulk of polyethylene terephthalate (PET) particles, wherein the PET particles have the following characteristics: (a) the particles comprise a shell and a core, wherein the shell substantially surrounds the core, wherein at least a portion of the shell exhibits strain-induced crystallinity and at least a portion of the core exhibits spherulitic crystallinity; (b) when measured on a first heating DSC scan, the particles have an onset-of-melting temperature greater than 180° C.; and a melting endotherm area greater than the absolute value of 1 J/g, 2 J/g, 4 J/g, 8 J/g, or 16 J/g., and (c) the particles have a degree of crystallinity less than 44 percent.

The particles of Embodiment K or Embodiment K with any one or more of the intervening features, wherein at least a portion of said particles are spheroidal.

The particles of Embodiment K or Embodiment K with any one or more of the intervening features, having a low melting peak temperature greater than 195° C.

The particles of Embodiment K or Embodiment K with any one or more of the intervening features, wherein said particles comprise less than 10 ppmw of antimony catalyst.

The particles of Embodiment K or Embodiment K with any one or more of the intervening features, wherein said particles comprise less than 100 ppm of one or more acetaldehyde scavengers.

The particles of Embodiment K or Embodiment K with any one or more of the intervening features, wherein said particles are substantially free of one or more acetaldehyde scavengers.

The particles of Embodiment K or Embodiment K with any one or more of the intervening features, having an intrinsic viscosity (It.V.) in the range of 0.70 dL/g to 1.2 dL/g, 0.70 dL/g to 1.1 dL/g, 0.72 dL/g to 1.2 dL/g, 0.72 dL/g to 1.1 dL/g, 0.76 dL/g to 1.2 dL/g, 0.76 dL/g to 1.1 dL/g, 0.78 dL/g to 1.2 dL/g, or 0.78 dL/g to 1.0 dL/g.

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A bulk of polyethylene terephthalate particles, wherein said particles have the following characteristics:
   (a) comprise a shell and a core, wherein said shell substantially surrounds said core, wherein at least a portion of said shell exhibits strain-induced crystallinity and at least a portion of said core exhibits spherulitic crystallinity;
   (b) when measured on a first heating DSC scan, said particles have a low melting peak temperature greater than 190° C., and a melting endotherm area greater than the absolute value of 1 J/g;
   (c) an intrinsic viscosity of from 0.78 to 1.1 dL/g; and
   (d) a total content of titanium, germanium, tin, and aluminum of less than 50 ppm.

2. The bulk of polyethylene terephthalate particles of claim 1, wherein a total content of titanium, germanium, tin, aluminum, Group I metals and Group II metals is less than 50 ppm.

3. The bulk of polyethylene terephthalate particles of claim 1, wherein the particles have not been subjected to polycondensation in the solid state.

4. The bulk of polyethylene terephthalate particles of claim 1, wherein (c) a degree of crystallinity is less than 45 percent.

5. The bulk of polyethylene terephthalate particles of claim 1, wherein the total content of titanium, germanium, tin, antimony, aluminum, Group I metals and Group II metals of less than 25 ppm.

6. The bulk of polyethylene terephthalate particles of claim 1, wherein said particles have a low melting peak temperature greater than 220° C.

7. The bulk of polyethylene terephthalate particles of claim 1, wherein said particles have a low melting peak temperature of from 220° C. to 235° C.

8. The bulk of polyethylene terephthalate particles of claim 1, wherein the intrinsic viscosity is from 0.81 to 0.84 dL/g.

9. The bulk of polyethylene terephthalate particles of claim 1, wherein the particles are particles of a polyethylene terephthalate resin comprising isophthalic acid monomer units in an amount of up to 20 mole % based on 100 mole % of carboxylic acid monomer units in the polyethylene terephthalate resin.

10. The bulk of polyethylene terephthalate particles of claim 1, wherein at least a portion of said particles are spheroidal.

11. The bulk of polyethylene terephthalate particles of claim 1, having an onset-of-melt temperature ($T_{om}$) greater than 175° C.

12. The bulk of polyethylene terephthalate particles of claim 1, wherein said particles comprise less than 100 ppm of one or more acetaldehyde scavengers.

13. The bulk of polyethylene terephthalate particles of claim 1, wherein said particles are substantially free of acetaldehyde scavengers.

14. A bulk of polyethylene terephthalate particles, wherein said particles have the following characteristics:
 (a) comprise a shell and a core, wherein said shell substantially surrounds said core, wherein at least a portion of said shell exhibits strain-induced crystallinity and at least a portion of said core exhibits spherulitic crystallinity;
 (b) when measured on a first heating DSC scan, said particles have a low melting peak temperature greater than 190° C., and a melting endotherm area greater than the absolute value of 1 J/g;
 (c) an intrinsic viscosity of from 0.78 to 1.1 dL/g; and
 (d) a total content of each of titanium, germanium, tin, and aluminum, independently, of less than 50 ppm.

15. The bulk of polyethylene terephthalate particles of claim 14, wherein a total content of each of Group I metals and Group II metals, independently, is less than 50 ppm.

16. The bulk of polyethylene terephthalate particles of claim 14, wherein the particles have not been subjected to polycondensation in the solid state.

17. The bulk of polyethylene terephthalate particles of claim 14, wherein (c) a degree of crystallinity is less than 45 percent.

18. The bulk of polyethylene terephthalate particles of claim 14, wherein the total content of titanium, germanium, tin, antimony, aluminum, Group I metals and Group II metals of less than 25 ppm.

19. The bulk of polyethylene terephthalate particles of claim 14, wherein said particles have a low melting peak temperature greater than 220° C.

20. The bulk of polyethylene terephthalate particles of claim 1, wherein said particles have a low melting peak temperature of from 220° C. to 235° C.

21. The bulk of polyethylene terephthalate particles of claim 14, wherein the intrinsic viscosity is from 0.81 to 0.84 dL/g.

22. The bulk of polyethylene terephthalate particles of claim 14, wherein the particles are particles of a polyethylene terephthalate resin comprising isophthalic acid monomer units in an amount of up to 20 mole % based on 100 mole % of carboxylic acid monomer units in the polyethylene terephthalate resin.

23. The bulk of polyethylene terephthalate particles of claim 14, wherein at least a portion of said particles are spheroidal.

24. The bulk of polyethylene terephthalate particles of claim 14, having an onset-of-melt temperature ($T_{om}$) greater than 175° C.

25. The bulk of polyethylene terephthalate particles of claim 14, wherein said particles comprise less than 100 ppm of one or more acetaldehyde scavengers.

26. The bulk of polyethylene terephthalate particles of claim 14, wherein said particles are substantially free of acetaldehyde scavengers.

* * * * *